US012651542B2

(12) United States Patent
Choi et al.

(10) Patent No.: US 12,651,542 B2
(45) Date of Patent: Jun. 9, 2026

(54) DISPLAY DEVICE AND DRIVING METHOD

(71) Applicant: LG Display Co., Ltd., Seoul (KR)

(72) Inventors: Jisu Choi, Paju-si (KR); Kyunghyun Lim, Paju-si (KR); Byungjae Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/978,502

(22) Filed: Dec. 12, 2024

(65) Prior Publication Data

US 2025/0246104 A1 Jul. 31, 2025

(30) Foreign Application Priority Data

Jan. 31, 2024 (KR) ........................ 10-2024-0014774

(51) Int. Cl.
*G09G 3/00* (2006.01)
*G09G 3/3258* (2016.01)

(52) U.S. Cl.
CPC ........... *G09G 3/006* (2013.01); *G09G 3/3258* (2013.01); *G09G 2300/0842* (2013.01); *G09G 2310/08* (2013.01); *G09G 2320/0233* (2013.01); *G09G 2320/045* (2013.01); *G09G 2330/021* (2013.01); *G09G 2330/12* (2013.01)

(58) Field of Classification Search
CPC .................................................... G09G 3/3233
See application file for complete search history.

(56) References Cited

U.S. PATENT DOCUMENTS

| | | | | |
|---|---|---|---|---|
| 2015/0179105 A1* | 6/2015 | Mizukoshi | G09G 3/3266 | |
| | | | 345/76 | |
| 2016/0086544 A1* | 3/2016 | Park | G09G 3/3233 | |
| | | | 345/82 | |
| 2018/0122302 A1* | 5/2018 | Koong | G09G 3/3266 | |
| 2022/0122528 A1* | 4/2022 | Kim | G09G 3/3225 | |

* cited by examiner

*Primary Examiner* — Nan-Ying Yang
(74) *Attorney, Agent, or Firm* — Morgan, Lewis & Bockius LLP

(57) ABSTRACT

A display device may include a plurality of subpixels. A period during which the plurality of subpixels are driven may include a first valid sensing period in which a valid sensing is performed on a first subpixel electrically connected to a first reference voltage line during a first frame period, and a dummy sensing period in which a dummy sensing is performed on the first subpixel or a second subpixel electrically connected to the first reference voltage line during a second frame period, thereby accurately sensing the characteristic values of subpixels. A driving method is also disclosed.

20 Claims, 17 Drawing Sheets

DISPLAY DEVICE AND DRIVING METHOD

CROSS REFERENCE TO RELATED APPLICATION

This application claims the benefit of and priority to Korean Patent Application No. 10-2024-0014774, filed on Jan. 31, 2024, the entire contents of which are incorporated herein by reference for all purposes as if fully set forth herein.

BACKGROUND

1. Technical Field

Embodiments of the present disclosure relate to a display device and a driving method of a display device.

2. Description of the Related Art

As the information society develops, the demand for display devices for displaying images is increasing in various forms, and in recent years, various display devices such as liquid crystal displays and organic light emitting display devices have been used.

A display device may include a scan transistor, a driving transistor, and a light emitting device.

The driving transistor may have characteristics such as a threshold voltage and a mobility.

The characteristics of the driving transistor may deteriorate, and the luminance of the display panel may become more uniform by compensating for differences in the characteristics of the driving transistor.

The characteristics of the driving transistor may be sensed through a sensing current. In this case, there may be a problem in that the sensing accuracy is lowered due to a noise included in the sensing current.

The description of the related art should not be assumed to be prior art merely because it is mentioned in or associated with this section. The description of the related art includes information that describes one or more aspects of the subject technology, and the description in this section does not limit the invention.

SUMMARY

Embodiments of the present disclosure may provide a display device and a driving method thereof capable of accurately sensing the characteristics of a subpixel.

Embodiments of the present disclosure may provide a display device and a driving method thereof capable of removing noise from the characteristics of a subpixel.

Embodiments of the present disclosure may provide a display device and a driving method thereof capable of accurately compensating for the luminance of a display panel.

Embodiments of the present disclosure may provide a display device and a driving method thereof capable of low power consumption by accurately sensing the characteristics of subpixels.

Embodiments of the present disclosure may provide a display device including a display device including a display panel on which a plurality of subpixels are disposed, and a data driving circuit configured to drive the display panel, wherein the plurality of subpixels include a driving transistor, a scan transistor, and a sensing transistor, wherein the scan transistor is for being electrically connected between a first node, which is a gate node of the driving transistor, the driving transistor is for being electrically connected between a second node and a third node, and a data line, and the sensing transistor is for being electrically connected between the second node and a reference voltage line, wherein a period during which the plurality of subpixels are driven includes a first valid sensing period in which a valid sensing is performed on a first subpixel electrically connected to a first reference voltage line during a first frame period, and a dummy sensing period in which a dummy sensing is performed on the first subpixel or a second subpixel electrically connected to the first reference voltage line during a second frame period.

Embodiments of the present disclosure may provide a driving method of a display device including performing a valid sensing on a first subpixel disposed in a first column line during a first frame period, performing a dummy sensing on the first subpixel or a second subpixel disposed in the first column line during a second frame period, and generating final compensation data based on valid data for the valid sensing and dummy data for the dummy sensing.

According to embodiments of the present disclosure, it is possible to provide a display device and a driving method thereof capable of accurately sensing the characteristics of a subpixel.

According to embodiments of the present disclosure, it is possible to provide a display device and a driving method thereof capable of removing noise from the characteristics of a subpixel.

According to embodiments of the present disclosure, it is possible to provide a display device and a driving method thereof capable of accurately compensating for the luminance of a display panel.

According to embodiments of the present disclosure, it is possible to provide a display device and a driving method thereof capable of low power consumption by accurately sensing the characteristics of subpixels.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the present disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the present disclosure, are incorporated in and constitute a part of this present disclosure, illustrate aspects and embodiments of the present disclosure, and together with the description serve to explain principles and examples of the disclosure.

Figure 1:
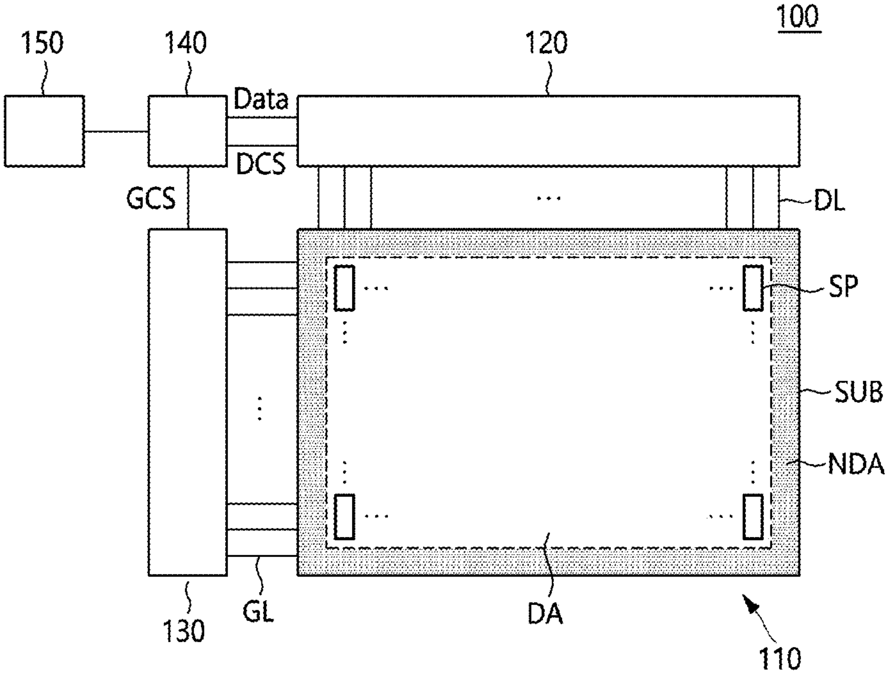
FIG. 1 is a system configuration diagram of a display device according to embodiments of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, the component may add other components unless the component "only" includes, has, or is composed of the other component. As used herein, the singular forms "a," "an" and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components are not limited by the denotations.

In describing the positional relationship between components, when two or more components are described as "connected," "coupled" or "linked," the two or more components may be directly "connected," "coupled" or "linked," or another component may intervene. Here, the other component may be included in one or more of the two or more components that are "connected," "coupled" or "linked" to each other.

When such terms as, e.g., "after," "next to," "after," and "before," are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

Hereinafter, various embodiments of the disclosure are described in detail with reference to the accompanying drawings.

FIG. 1 is a system configuration diagram of a display device according to embodiments of the present disclosure.

FIG. 1 is a system configuration diagram of a display device 100 according to embodiments of the present disclosure.

Referring to FIG. 1, a display device 100 according to embodiments of the present disclosure may include a display panel 110 and a driving circuit for driving the display panel 110.

The driving circuit may include a data driving circuit 120 and a gate driving circuit 130, and may further include a controller 140 which controls the data driving circuit 120 and the gate driving circuit 130.

The display panel 110 may include a substrate SUB and signal lines such as a plurality of data lines DL and a plurality of gate lines GL disposed on the substrate SUB. The display panel 110 may include a plurality of subpixels SP connected to a plurality of data lines DL and a plurality of gate lines GL.

The display panel 110 may include a display area DA where an image is displayed and a non-display area NDA where an image is not displayed. In the display panel 110, a plurality of subpixels SP for displaying an image may be disposed in the display area DA. In the non-display area NDA, the driving circuits 120, 130 and 140 may be electrically connected or the driving circuits 120, 130 and 140 may be mounted, or there may be disposed a pad portion to which an integrated circuit or printed circuit is connected.

The data driving circuit 120 is a circuit for driving a plurality of data lines DL, and may supply data signals to the plurality of data lines DL. The gate driving circuit 130 is a circuit for driving a plurality of gate lines GL, and may supply gate signals to the plurality of gate lines GL. The controller 140 may supply a data control signal DCS to the data driving circuit 120 to control the operation timing of the data driving circuit 120. The controller 140 may supply a gate control signal GCS to the gate driving circuit 130 to control the operation timing of the gate driving circuit 130.

The controller 140 may start scanning according to the timing implemented in each frame, convert the input image data input from the outside to fit the data signal format used in the data driving circuit 120, supply the converted image data Data to the data driving circuit 120, and control a data driving at an appropriate time according to the scan.

The controller 140 may receive various timing signals including a vertical synchronization signal VSYNC, a horizontal synchronization signal HSYNC, an input data enable signal DE, and a clock signal CLK along with input image data from the outside (e.g., the host system 150).

In order to control the data driving circuit 120 and the gate driving circuit 130, the controller 140 may receive timing signals such as a vertical synchronization signal VSYNC, a horizontal synchronization signal HSYNC, an input data enable signal DE and a clock signal CLK, and generate various control signals DCS and GCS to output to the data driving circuit 120 and the gate driving circuit 130.

For example, the controller 140 may output various gate control signals GCS including a gate start pulse GSP, a gate shift clock GSC and gate output enable signal GOE in order to control the gate driving circuit 130.

In addition, in order to control the data driving circuit 120, the controller 140 may output various data control signals DCS such as a source start pulse SSP, a source sampling clock SSC, and a source output enable signal SOE.

The controller 140 may be implemented as a separate component from the data driving circuit 120, or may be integrated with the data driving circuit 120 and implemented as an integrated circuit.

The data driving circuit 120 may receive image data Data from the controller 140 and supply a data voltage to the plurality of data lines DL, thereby driving the plurality of data lines DL. Here, the data driving circuit 120 may be also called a source driving circuit.

The data driving circuit 120 may include one or more source driver integrated circuits SDIC.

Each source driver integrated circuit SDIC may include a shift register, a latch circuit, a digital to analog converter DAC, and an output buffer. In some cases, each source driver integrated circuit SDIC may further include an analog to digital converter ADC.

For example, each source driver integrated circuit SDIC may be connected to the display panel 110 using a tape automated bonding (TAB) method, or may be connected to a bonding pad of the display panel 110 using a chip-on-glass (COG) method or a chip-on-panel (COP) method, or may be connected to the display panel 110 by being implemented using a chip-on-film (COF) method.

The gate driving circuit 130 may output a gate signal of a turn-on level voltage or a gate signal of a turn-off level voltage according to the control of the controller 140. The gate driving circuit 130 may sequentially drive a plurality of gate lines GL by sequentially supplying a gate signal with a turn-on level voltage to the plurality of gate lines GL.

The gate driving circuit 130 may be connected to the display panel 110 using a tape automated bonding (TAB) method, or may be connected to a bonding pad of the display panel 110 using a chip-on-glass (COG) method or a chip-on-panel (COP) method, or may be connected to the display panel 110 by a chip-on-film (COF) method. Alternatively, the gate driving circuit 130 may be a gate-in-panel (GIP) type, and may be formed in the non-display area NDA of the display panel 110. The gate driving circuit 130 may be disposed on or connected to the substrate SUB. That is, if the gate driving circuit 130 is a GIP type, the gate driving circuit 130 may be disposed in the non-display area NDA of the substrate SUB. The gate driving circuit 130 may be connected to the substrate SUB in the case of a chip-on-glass (COG) type or chip-on-film (COF) type.

Meanwhile, at least one of the data driving circuit 120 and the gate driving circuit 130 may be disposed in the display area DA of the display panel 110. For example, at least one of the data driving circuit 120 and the gate driving circuit 130 may be disposed not to overlap the subpixels SP, and may be disposed to partially or entirely overlap the subpixels SP.

If a specific gate line GL is opened by the gate driving circuit 130, the data driving circuit 120 may convert the image data Data received from the controller 140 into an analog data voltage to supply to a plurality of data lines DL.

The data driving circuit 120 may be connected to one side (e.g., the upper or lower side) of the display panel 110. Depending on the driving method or panel design method, the data driving circuit 120 may be connected to both sides (e.g., upper and lower sides) of the display panel 110, or may be connected to two or more of the four sides of the display panel 110.

The gate driving circuit 130 may be connected to one side (e.g., left or right) of the display panel 110. Depending on the driving method or panel design method, the gate driving circuit 130 may be connected to both sides (e.g., left and right) of the display panel 110, or may be connected to two or more of the four sides of the display panel 110.

The controller 140 may be a timing controller used in typical display technology, or may be a control device capable of further performing other control functions including a timing controller, or may be a control device different from the timing controller, or may be a control device other than a timing controller, or may be a circuit within the control device. The display controller 140 may be implemented with various circuits or electronic components, such as an integrated circuit (IC), a field programmable gate array (FPGA), an application specific integrated circuit (ASIC), or Processor.

The controller 140 may be mounted on a printed circuit board, a flexible printed circuit, and may be electrically connected to the data driving circuit 120 and the gate driving circuit 130 through a printed circuit board, a flexible printed circuit.

The controller 140 may transmit and receive signals with the data driving circuit 120 according to one or more predetermined interfaces. For example, the interface may include a low voltage differential signaling (LVDS) interface, an embedded clock point-point interface (EPI) interface, or a serial peripheral interface (SPI).

The controller 140 may include a storage medium such as one or more registers.

The display device 100 according to the present embodiments may be a display including a back light unit such as a liquid crystal display, or may be a self-luminous display such as an organic light emitting diode (OLED) display, a quantum dot display, or a micro light emitting diode (Micro LED) display.

In the case that the display device 100 according to the present embodiments is an organic light emitting diode (OLED) display, each subpixel SP may include an organic light emitting diode (OLED) which emits light as a light emitting device. If the display device 100 according to the present embodiments is a quantum dot display, each subpixel SP may include a light emitting element made of quantum dots, which are semiconductor crystals that emit light on their own. If the display device 100 according to the present embodiments is a micro LED display, each subpixel SP may include a micro LED which is made of inorganic materials and emits light by itself as a light emitting device.

Figure 2A:
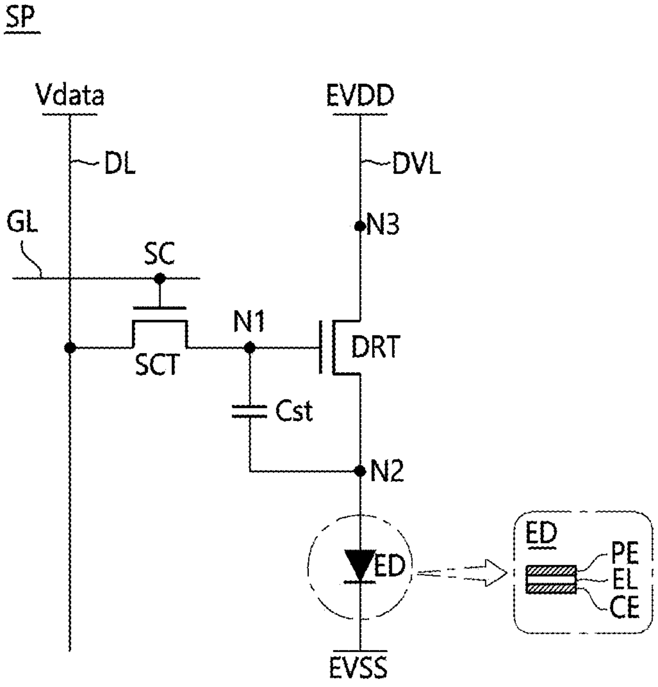
FIGS. 2A and 2B are equivalent circuits of a subpixel of a display device according to embodiments of the present disclosure.
Figure 2B:
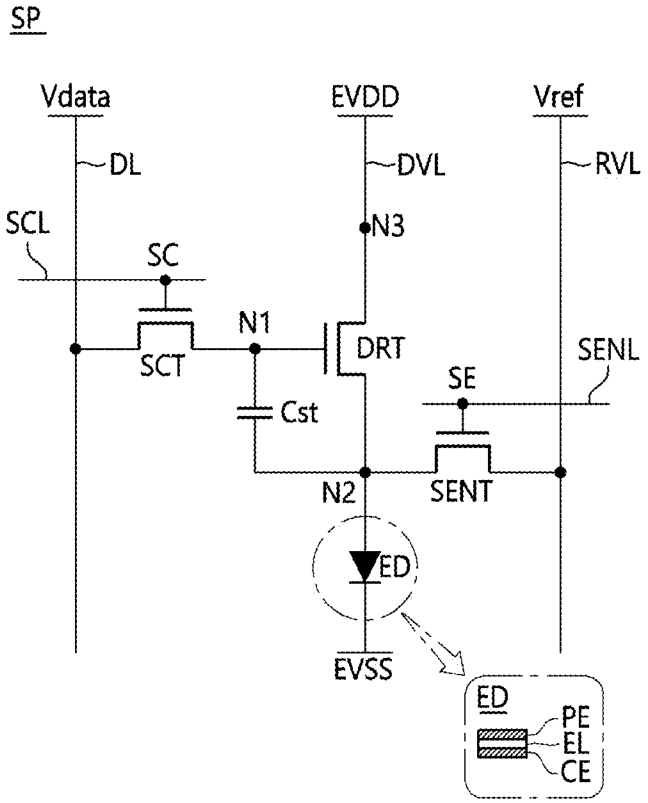

FIGS. 2A and 2B are equivalent circuits of a subpixel SP of a display device 100 according to embodiments of the present disclosure.

Referring to FIG. 2A, each of the plurality of subpixels SP disposed on the display panel 110 of the display device 100 according to embodiments of the present disclosure may include a light emitting device ED and a driving transistor DRT, a scan transistor SCT, and a storage capacitor Cst.

Referring to FIG. 2A, the light emitting device ED may include a pixel electrode PE and a common electrode CE, and a light emission layer EL located between the pixel electrode PE and the common electrode CE.

The pixel electrode PE of the light emitting device ED may be an electrode disposed in each subpixel SP, and the common electrode CE may be an electrode commonly disposed in all subpixels SP. Here, the pixel electrode PE may be an anode electrode and the common electrode CE may be a cathode electrode. Conversely, the pixel electrode PE may be a cathode electrode and the common electrode CE may be an anode electrode.

For example, the light emitting device ED may be an organic light emitting diode (OLED), a light emitting diode (LED), or a quantum dot light emitting device.

The driving transistor DRT is a transistor for driving the light emitting device ED, and may include a first node N1, a second node N2, and a third node N3.

The first node N1 of the driving transistor DRT may be a gate node of the driving transistor DRT, and may be electrically connected to a source node or a drain node of the scan transistor SCT. The second node N2 of the driving transistor DRT may be a source node or a drain node of the driving transistor DRT, and may be electrically connected to a source node or a drain node of the sensing transistor SENT, and may be electrically connected to the pixel electrode PE of the light emitting device ED. The third node N3 of the driving transistor DRT may be electrically connected to a driving voltage line DVL which supplies a driving voltage EVDD.

The scan transistor SCT may be controlled by a scan signal SC, which is a type of gate signal, and may be connected between the first node N1 of the driving transistor DRT and a data line DL. That is, the scan transistor SCT may be turned on or turned off depending on the scan signal SC supplied from a scan signal line SCL, which is a type of gate line GL to control the connection between the first nodes N1 of the driving transistor DRT, and the data line DL.

The scan transistor SCT may be turned on by the scan signal SC having a turn-on level voltage, and may transmit a data voltage Vdata supplied from the data line DL to the first node N1 of the driving transistor DRT.

Here, if the scan transistor SCT is an n-type transistor, the turn-on level voltage of the scan signal SC may be a high level voltage. If the scan transistor SCT is a p-type transistor, the turn-on level voltage of the scan signal SC may be a low level voltage.

The storage capacitor Cst may be connected between the first node N1 and the second node N2 of the driving transistor DRT. The storage capacitor Cst may be charged with a charge corresponding to the voltage difference between both ends, and may maintain the voltage difference between both ends for a set frame time period. Accordingly, the corresponding subpixel SP may emit light during a set frame time period.

Referring to FIG. 2B, each of the plurality of subpixels SP disposed on the display panel 110 of the display device 100 according to embodiments of the present disclosure may further include a sensing transistor SENT.

The sensing transistor SENT may be controlled by a sense signal SE, which is a type of gate signal, and may be connected between the second node N2 of the driving transistor DRT and a reference voltage line RVL. That is, the sensing transistor SENT may be turned on or turned off depending on the sense signal SE supplied from a sense signal line SENL, which is another type of gate line GL, and may be turned on and turned off to control the connection between the reference voltage line RVL and the second node N2 of the driving transistor DRT.

The sensing transistor SENT may be turned on by the sense signal SE having a turn-on level voltage, and may transfer a reference voltage Vref supplied from the reference voltage line RVL to the second node N2 of the driving transistor DRT.

In addition, the sensing transistor SENT may be turned on by the sense signal SE having a turn-on level voltage, and may transfer the voltage of the second node N2 of the driving transistor DRT to the reference voltage line RVL.

Here, in the case that the sensing transistor SENT is an n-type transistor, the turn-on level voltage of the sense signal SE may be a high level voltage. If the sensing transistor SENT is a p-type transistor, the turn-on level voltage of the sense signal SE may be a low level voltage.

The function of the sensing transistor SENT to transfer the voltage of the second node N2 of the driving transistor DRT to the reference voltage line RVL may be used when driving to sense the characteristic value of the subpixel SP. In this case, the voltage transmitted to the reference voltage line RVL may be a voltage for calculating the characteristic value of the subpixel SP or a voltage reflecting the characteristic value of the subpixel SP.

In the present disclosure, the characteristic value of the subpixel SP may be the characteristic value of the driving transistor DRT or the light emitting device ED. The characteristic value of the driving transistor DRT may include a threshold voltage and a mobility of the driving transistor DRT. The characteristic value of the light emitting device ED may include a threshold voltage of the light emitting device ED.

Each of the driving transistor DRT, the scan transistor SCT, and the sensing transistor SENT may be an n-type transistor or a p-type transistor. In this disclosure, for convenience of explanation, it will be exemplified a case in which the driving transistor DRT, scan transistor SCT, and sensing transistor SENT are each n-type.

The storage capacitor Cst may be an external capacitor intentionally designed outside the driving transistor DT rather than a parasitic capacitor (e.g., Cgs, Cgd) as an internal capacitor which exists between the gate node and the source node (or the drain node) of the driving transistor DRT.

The scan signal line SCL and sense signal line (SENL) may be different gate lines GL. In this case, the scan signal SC and the sense signal SE may be separate gate signals, and the on-off timing of the scan transistor SCT and the on-off timing of the sensing transistor SENT within one subpixel SP may be independent. That is, the on-off timing of the scan transistor SCT and the on-off timing of the sensing transistor SENT within one subpixel SP may be the same or different.

Alternatively, the scan signal line SCL and the sense signal line SENL may be the same gate line GL. That is, the gate node of the scan transistor SCT and the gate node of the sensing transistor SENT within one subpixel SP may be connected to one gate line GL. In this case, the scan signal SC and the sense signal SE may be the same gate signal, and the on-off timing of the scan transistor SCT and the on-off timing of the sensing transistor SENT within one subpixel SP may be the same.

The structure of the subpixel SP shown in FIGS. 2A and 2B is only an example and may be modified in various ways by including one or more transistors or one or more capacitors.

In FIGS. 2A and 2B, the subpixel structure is explained assuming that the display device 100 is a self-luminous display device. However, if the display device 100 is a liquid crystal display device, each subpixel SP may include a transistor and a pixel electrode.

Figure 3:
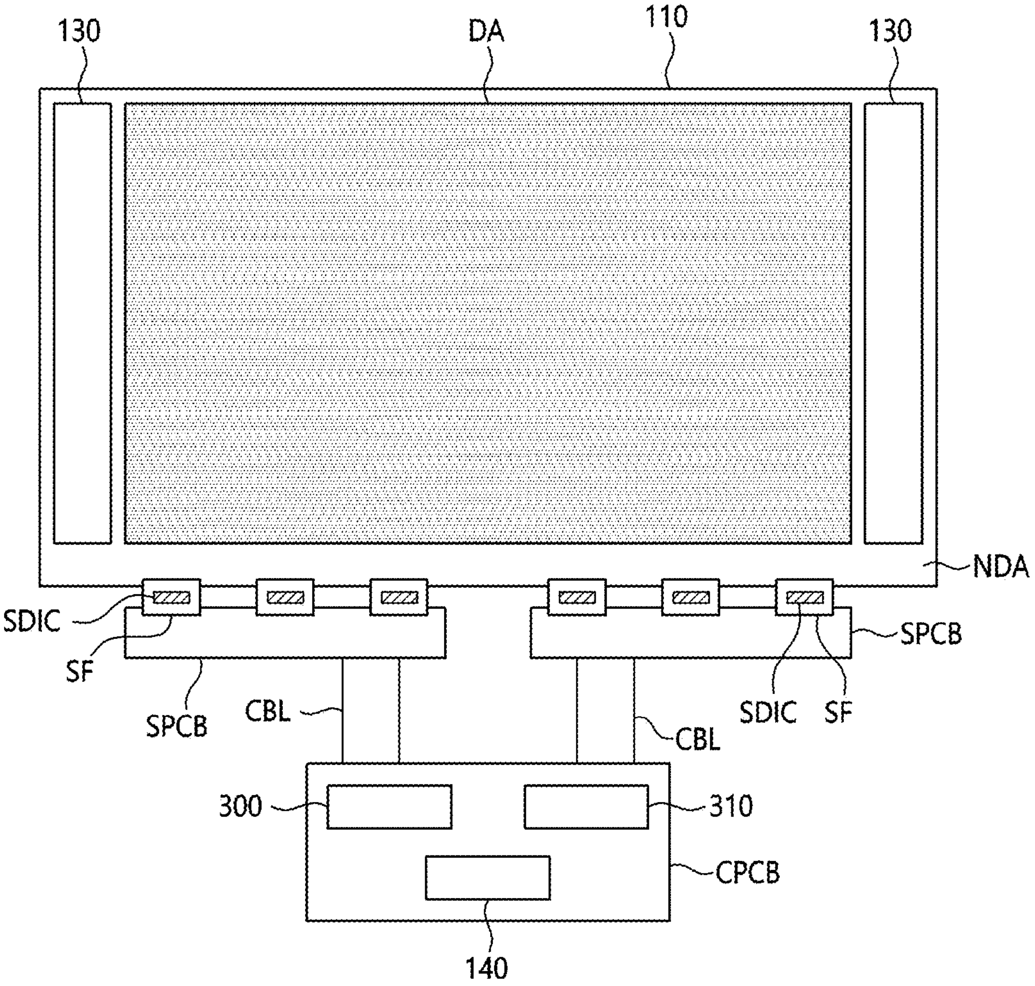
FIG. 3 illustrates a system of a display device according to embodiments of the present disclosure.

FIG. 3 illustrates a system of a display device 100 according to embodiments of the present disclosure.

Referring to FIG. 3, the display panel 110 may include a display area DA where an image is displayed and a non-display area NDA where an image is not displayed.

Referring to FIG. 3, if the data driving circuit 120 includes one or more source driver integrated circuits SDIC and is implemented in a chip-on-film (COF) method, each source driver integrated circuit SDIC may be mounted on a circuit film SF connected to the non-display area NDA of the panel 110.

Referring to FIG. 3, the gate driving circuit 130 may be implemented as a gate-in-panel (GIP) type. In this case, the gate driving circuit 130 may be formed in the non-display area NDA of the display panel 110. Unlike FIG. 3, the gate driving circuit 130 may be implemented as a chip-on-film (COF) type.

For circuit connection between one or more source driver integrated circuits SDIC and other devices, the display device 100 may include at least one source printed circuit board SPCB and a control printed circuit board CPCB for mounting control components and various electrical devices.

A film SF on which a source driver integrated circuit SDIC is mounted may be connected to at least one source printed circuit board SPCB. That is, one side of the film SF on which the source driver integrated circuit SDIC is mounted may be electrically connected to the display panel 110 and the other side may be electrically connected to the source printed circuit board SPCB.

The controller 140 and a power management integrated circuit (PMIC) 310 may be mounted on the control printed circuit board CPCB. The controller 140 may perform overall control functions related to driving the display panel 110 and control the operations of the data driving circuit 120 and the gate driving circuit 130. The power management integrated circuit 310 may supply various voltages or currents to the data driving circuit 120 and the gate driving circuit 130, or control various voltages or currents to be supplied.

At least one source printed circuit board SPCB and a control printed circuit board CPCB may be electrically connected through at least one connection cable CBL. Here, the connection cable CBL may be, for example, a flexible printed circuit (FPC), a flexible flat cable (FFC), etc.

At least one source printed circuit board SPCB and a control printed circuit board CPCB may be integrated and implemented as a single printed circuit board.

The display device 100 according to embodiments of the present disclosure may further include a level shifter 300 for adjusting the voltage level. For example, the level shifter 300 may be disposed on a control printed circuit board CPCB or a source printed circuit board SPCB.

In particular, in the display device 100 according to embodiments of the present disclosure, the level shifter 300 may supply signals necessary for gate driving to the gate driving circuit 130. For example, the level shifter 300 may supply a plurality of clock signals to the gate driving circuit 130. Accordingly, the gate driving circuit 130 may output a plurality of gate signals to a plurality of gate lines GL based on a plurality of clock signals input from the level shifter 300. Here, the plurality of gate lines GL may transmit a plurality of gate signals to the subpixels SP disposed in the display area DA of the substrate SUB.

Figure 4:
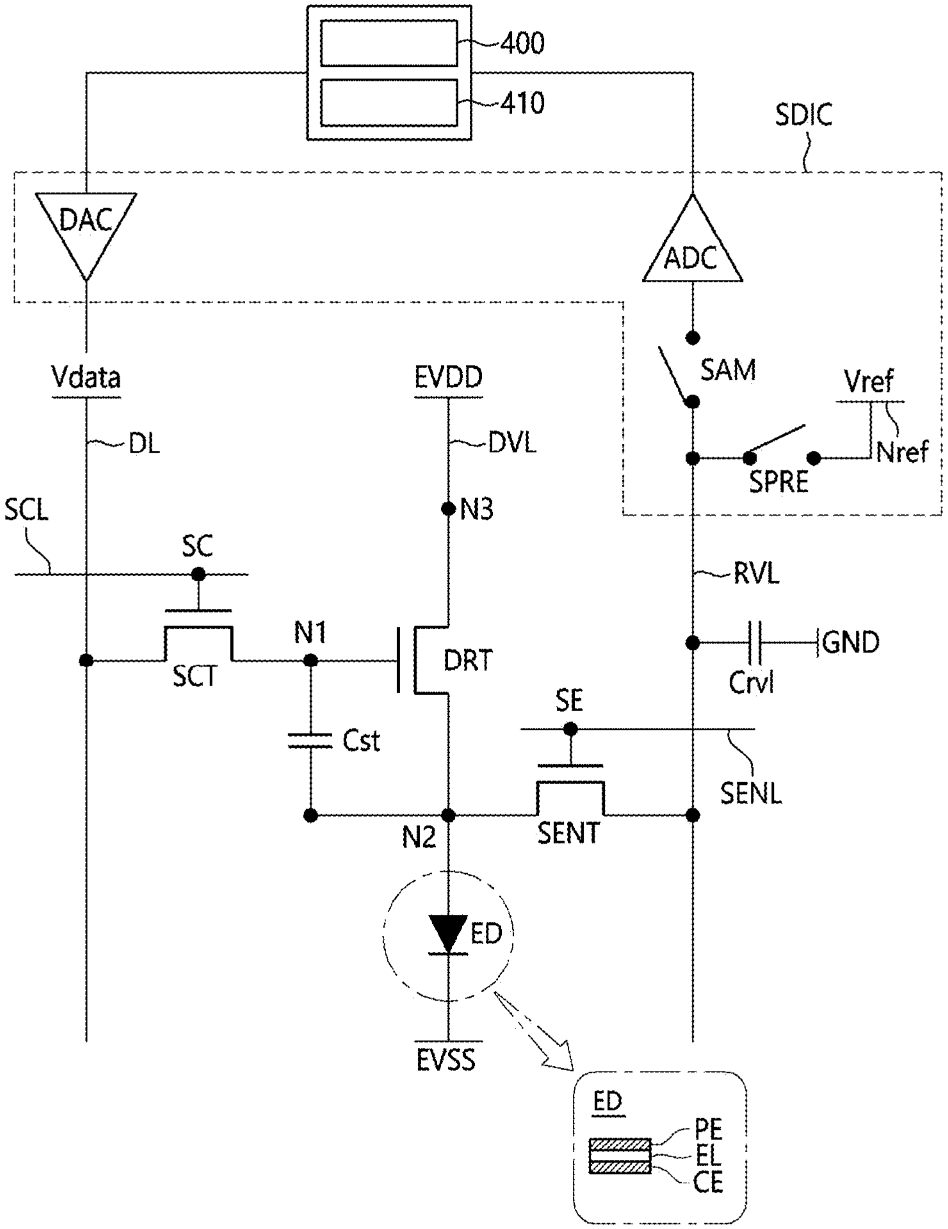
FIG. 4 illustrates a compensation circuit of a display device according to embodiments of the present disclosure.

FIG. 4 illustrates a compensation circuit of a display device 100 according to embodiments of the present disclosure.

Referring to FIG. 4, the compensation circuit may be a circuit capable of performing sensing and compensation processing for the characteristic values of circuit elements within the subpixel SP.

The compensation circuit may be connected to the subpixel SP, and may include a power switch SPRE, a sampling switch SAM, an analog-to-digital converter ADC, and a compensator 400.

The power switch SPRE may control the connection between the reference voltage line RVL and a reference voltage supply node Nref. A reference voltage Vref output from the power supply may be supplied to the reference voltage supply node Nref, and the reference voltage Vref supplied to the reference voltage application node Nref may be supplied to the reference voltage line RVL.

The sampling switch SAM may control the connection between the analog-to-digital converter ADC and the reference voltage line RVL. If the analog-to-digital converter ADC is connected to the reference voltage line RVL by the sampling switch (SAM), the analog-to-digital converter ADC may convert the voltage (e.g., analog voltage) of the connected reference voltage line RVL into a sensing value corresponding to a digital value.

A line capacitor Crvl may be formed between the reference voltage line RLV and a ground GND. The voltage of the reference voltage line RVL may correspond to the charge amount of the line capacitor Crvl.

The analog-to-digital converter ADC may provide sensing data including sensing values to the compensator 400.

The compensator 400 may determine the characteristic value of the light emitting device ED or the driving transistor DRT included in the corresponding subpixel SP based on the sensing data, calculate a compensation value, and store the compensation value in a memory 410.

For example, the compensation value may be information for reducing the characteristic value deviation between the light emitting devices ED or the characteristic value deviation between the driving transistors DRT, and may include a offset and a gain value for data change.

The controller 140 may change image data using the compensation value stored in the memory 410, and supply the changed image data to the data driving circuit 120.

The data driving circuit 120 may use a digital-to-analog converter DAC to convert the changed image data into a data voltage Vdata corresponding to an analog voltage and output the data voltage Vdata. Accordingly, compensation may be performed.

Referring to FIG. 4, the analog-to-digital converter ADC, the power switch SPRE, and the sampling switch SAM may be included in a source driver integrated circuit SDIC included in the data driving circuit 120. The compensator 400 may be included in controller 140.

As described above, the display device 100 according to embodiments of the present disclosure may perform compensation processing to reduce the deviation of characteristic values between the driving transistors DRT. In addition, in order to perform compensation processing, the display device 100 may perform a sensing driving to find out the deviation of characteristic values between the driving transistors DRT.

The display device 100 according to embodiments of the present disclosure may perform sensing driving in two modes (e.g., fast mode and slow mode). Hereinafter, it will be described a sensing driving in two modes (e.g., fast mode and slow mode) with reference to FIGS. 5A and 5B.

Figure 5A:
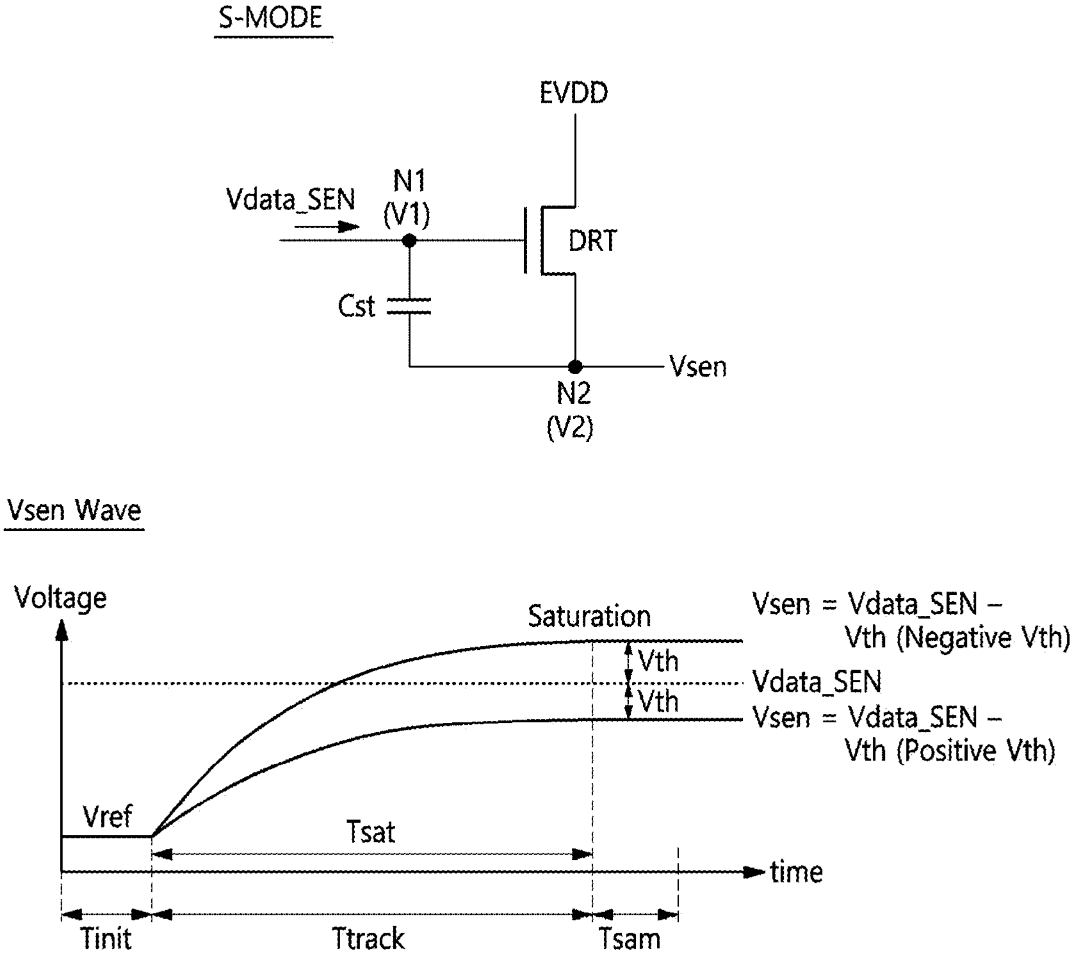
FIG. 5A is a diagram of a first sensing mode of a display device according to embodiments of the present disclosure.
Figure 5B:
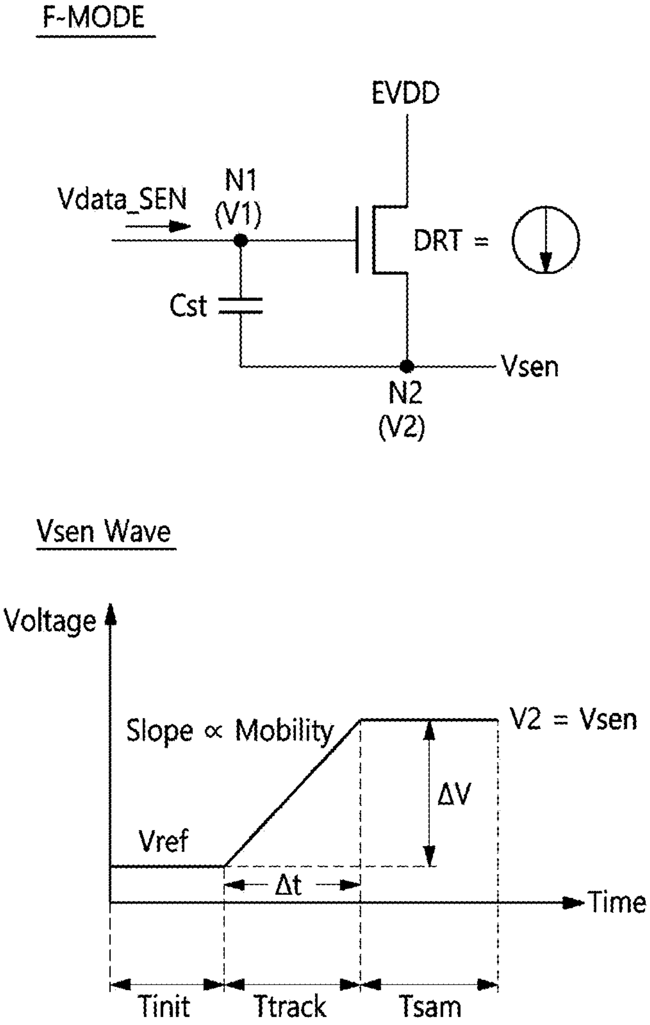
FIG. 5B is a diagram of a second sensing mode of a display device according to embodiments of the present disclosure.

FIG. 5A illustrates a first sensing mode (i.e., S-Mode) of the display device 100 according to embodiments of the present disclosure. FIG. 5B illustrates a second sensing mode (i.e., F-Mode) of the display device 100 according to embodiments of the present disclosure.

Referring to FIG. 5A, the first sensing mode (S-Mode) may be a sensing driving mode for slow sensing a characteristic value (e.g., threshold voltage) which requires a relatively long driving time among the characteristic values (e.g., threshold voltage, mobility) of the driving transistor DRT. The first sensing mode (S-Mode) may also be referred to as a slow mode or a threshold voltage sensing mode.

Referring to FIG. 5B, the second sensing mode (F-Mode) may be a sensing driving mode for quickly sensing a characteristic value (e.g., mobility) which requires a relatively short driving time among the characteristic values (e.g., threshold voltage, mobility) of the driving transistor DRT. The second sensing mode (F-Mode) may also be referred to as a fast mode or a mobility sensing mode.

Referring to FIGS. 5A and 5B, a sensing driving period of the first sensing mode (S-Mode) and a sensing driving period of the second sensing mode (F-Mode) each may include an initialization period Tinit and a tracking period Ttrack and a sampling period Tsam. Hereinafter, it will be described each of the first sensing mode (S-Mode) and the second sensing mode (F-Mode).

First, the sensing driving period of the first sensing mode (S-Mode) of the display device 100 will be described with reference to FIG. 5A.

Referring to FIG. 5A, the initialization period Tinit during the sensing driving period of the first sensing mode (S-Mode) may be a period of time for initializing the first node N1 and the second node N2 of the driving transistor DRT.

During the initialization period Tinit, the voltage V1 of the first node N1 of the driving transistor (DRT) may be initialized to a data voltage Vdata_SEN for sensing driving, and the voltage V2 of the second node N2 of the driving transistor DRT may be initialized to the data voltage Vdata_SEN for sensing driving.

During the initialization period Tinit, the scan transistor SCT and the sense transistor SENT may be turned on, and the power switch SPRE may be turned on.

Referring to FIG. 5A, the tracking period (Ttrack) during the sensing driving period of the first sensing mode (S-Mode) may be a period of tracking the voltage V2 of the second node N2 of the driving transistor DRT, which reflect a threshold voltage Vth of the driving transistor DRT or a change in the threshold voltage Vth.

During the tracking period Ttrack, the power switch SPRE may be turned off or the sense transistor SENT may be turned off.

Accordingly, during the tracking period Ttrack, the first node N1 of the driving transistor DRT may be in a constant voltage state with the data voltage Vdata_SEN for sensing driving, but the second node N2 of the driving transistor DRT may be in an electrical floating state. Accordingly, during the tracking period Ttrack, the voltage V2 of the second node N2 of the driving transistor DRT may change.

During the tracking period Ttrack, the voltage V2 of the second node N2 of the driving transistor DRT may increase until the voltage V2 of the second node N2 of the driving transistor DRT reflects the threshold voltage Vth of the driving transistor DRT.

During the initialization period Tinit, the voltage difference between the initialized first node N1 and the second node N2 of the driving transistor DRT may be greater than or equal to the threshold voltage Vth of the driving transistor DRT. Accordingly, when the tracking period Ttrack starts, the driving transistor DRT may be turned on and conduct current. Accordingly, when the tracking period Ttrack starts, the voltage V2 of the second node N2 of the driving transistor DRT may increase.

During the tracking period Ttrack, the voltage V2 of the second node N2 of the driving transistor DRT may not continuously increase.

As the latter part of the tracking period Ttrack progresses, the voltage increase degree of the second node N2 of the driving transistor DRT may decrease, and eventually, the voltage V2 of the second node N2 of the driving transistor DRT may be saturated.

The saturated voltage V2 of the second node N2 of the driving transistor DRT may correspond to the difference Vdata_SEN-Vth between the data voltage Vdata_SEN and the threshold voltage Vth or the difference Vdata_SEN-ΔVth between the data voltage Vdata_SEN and the threshold voltage deviation ΔVth. Here, the threshold voltage Vth may be a negative threshold voltage or a positive threshold voltage.

When the voltage V2 of the second node N2 of the driving transistor DRT is saturated, the sampling period Tsam may start.

Referring to FIG. 5A, the sampling period (Tsam) during the sensing driving period of the first sensing mode (S-Mode) may be a period for measuring the voltage Vdata_SEN-Vth and Vdata_SEN-ΔVth reflecting a threshold voltage Vth of the driving transistor DRT or a change in the threshold voltage Vth of the driving transistor DRT.

The sampling period Tsam during the sensing driving period of the first sensing mode (S-Mode) may be a period in which the analog-to-digital converter ADC senses a voltage of a reference voltage line RVL. Here, the voltage of the reference voltage line RVL may correspond to the voltage of the second node N2 of the driving transistor DRT and the a charging voltage of a line capacitor Crvl formed on the reference voltage line RVL.

During the sampling period Tsam, the voltage Vsen sensed by the analog-to-digital converter ADC may be a voltage Vdata_SEN-Vth minus the threshold voltage Vth from the data voltage Vdata_SEN or a voltage Vdata_SEN-ΔVth minus the threshold voltage deviation ΔVth from the data voltage Vdata_SEN. Here, Vth may be a positive threshold voltage or a negative threshold voltage.

Referring to FIG. 5A, during the tracking period Ttrack during the sensing driving period of the first sensing mode (S-Mode), a saturation time Tsat required for the voltage V2 of the second node N2 of the driving transistor DRT to increase and then be saturated may be a length of time of the tracking period Ttrack within the sensing driving period of the first sensing mode S-Mode or a period for the threshold voltage Vth of the driving transistor DRT or its change to be reflected in the voltage (i.e., V2=Vdata_SEN-Vth) of the second node N2 of the driving transistor DRT.

This saturation time Tsat may occupy most of the overall temporal length of the sensing driving period of the first sensing mode (S-Mode). In the case of the first sensing mode (S-Mode), there may take relatively long time for the voltage V2 of the second node N2 of the driving transistor DRT to rise and become saturated.

As described above, since it is required a relatively long saturation time Tsat until the voltage state of the second node N2 of the driving transistor DRT represents the threshold voltage of the driving transistor (DRT), a sensing driving method for sensing the threshold voltage of the driving transistor DRT may be referred to as a slow mode (e.g., a first sensing mode, S-Mode).

It will be described a sensing driving period of the second sensing mode (F-Mode) of the display device 100 with reference to FIG. 5B.

Referring to FIG. 5B, the initialization period Tinit within the sensing driving period of the second sensing mode (F-Mode) may be a period for initializing the first node N1 and the second node N2 of the driving transistor DRT.

During the initialization period Tinit, the scan transistor SCT and the sense transistor SENT may be turned on, and the power switch SPRE may be turned on.

During the initialization period Tinit, the voltage V1 of the first node N1 of the driving transistor DRT may be initialized to the data voltage Vdata_SEN for sensing driving, and the voltage V2 of the second node N2 of the driving transistor DRT may be initialized to the reference voltage Vref for sensing driving.

Referring to FIG. 5B, the tracking period Ttrack within the sensing driving period of the second sensing mode (F-Mode) may be a period during which the voltage V2 of the second node N2 of the driving transistor DRT changes for a preset tracking time Δt until the voltage V2 of the second node N2 of the driving transistor DRT becomes a voltage state reflecting the mobility or change in mobility of the driving transistor DRT.

During the tracking period Ttrack, the preset tracking time Δt may be set short. Therefore, during a short tracking time Δt, there may be difficult for the voltage V2 of the second node N2 of the driving transistor DRT to reflect the threshold voltage Vth. However, during a short tracking time Δt, the voltage V2 of the second node N2 of the driving transistor DRT may be changed enough to determine the mobility of the driving transistor DRT.

Accordingly, the second sensing mode (F-Mode) may be a sensing driving method for sensing the mobility of the driving transistor DRT.

In the tracking period Ttrack, the power switch SPRE may be turned off or the sense transistor SENT may be turned off, so the second node N2 of the driving transistor DRT may be electrically floating.

During the tracking period Ttrack, the scan transistor SCT may be turned off by the scan signal SC of the turn-off level voltage, and the first node N1 of the driving transistor DRT may be also in a floating state.

During the initialization period Tinit, the voltage difference between the initialized first node N1 and the second node N2 of the driving transistor DRT may be greater than or equal to the threshold voltage Vth of the driving transistor DRT. Accordingly, when the tracking period Ttrack starts, the driving transistor DRT may be turned on and conduct current.

Here, if the first node N1 and the second node N2 of the driving transistor DRT are a gate node and a source node, respectively, the voltage difference between the first node N1 and the second node N2 of the driving transistor DRT may be Vgs.

Accordingly, during the tracking period Ttrack, the voltage V2 of the second node N2 of the driving transistor DRT may increase. At this time, the voltage V1 of the first node N1 of the driving transistor DRT may also increase.

During the tracking period Ttrack, the rate of increase of the voltage V2 of the second node N2 of the driving transistor DRT may vary depending on the current capability (i.e., mobility) of the driving transistor DRT. As the current capability (i.e., mobility) of the driving transistor DRT increases, the voltage V2 of the second node N2 of the driving transistor DRT may increase more steeply.

After the tracking period Ttrack progresses for the preset tracking time Δt, that is, after the voltage V2 of the second node N2 of the driving transistor DRT increases for the preset tracking time Δt, the sampling period Tsam may proceed.

During the tracking period Ttrack, the rate of increase of the voltage V2 of the second node N2 of the driving transistor DRT may correspond to the voltage change ΔV of the second node N2 of the driving transistor DRT during the preset tracking time Δt. Here, the voltage change ΔV of the second node N2 of the driving transistor DRT may correspond to the voltage change of the reference voltage line RVL.

Referring to FIG. 5B, after the tracking period Ttrack progresses for a preset tracking time Δt, the sampling period Tsam may start. During the sampling period Tsam, the sampling switch SAM may be turned on, so that the reference voltage line RVL and the analog-to-digital converter ADC may be electrically connected.

The analog-to-digital converter ADC may sense the voltage of the reference voltage line RV. The voltage Vsen sensed by the analog-to-digital converter ADC may be a voltage Vref+ΔV increased from the reference voltage Vref by the amount of voltage change ΔV for a preset tracking time Δt.

The voltage Vsen sensed by the analog-to-digital converter ADC may be the voltage of the reference voltage line RVL, and may be a voltage of the second node N2 electrically connected to the reference voltage line RVL through the sense transistor SENT.

Referring to FIG. 5B, during the sampling period Tsam within the sensing driving period of the second sensing mode (F-Mode), the voltage Vsen sensed by the analog-to-digital converter ADC may vary depending on the mobility of the driving transistor DRT. The higher the driving transistor DRT has a higher mobility, the higher the sensing voltage Vsen. The lower the mobility of the driving transistor DRT, the lower the sensing voltage Vsen.

As described above, since the voltage of the second node N2 of the driving transistor DRT needs to be changed only for a short time Δt, the sensing driving method for sensing the mobility of the driving transistor (DRT) may be referred to as a fast mode (e.g., second sensing mode, F-Mode).

Referring to FIG. 5A, the display device 100 according to embodiments of the present disclosure may determine the threshold voltage Vth of the driving transistor DRT in the corresponding subpixel SP or its change based on the voltage Vsen sensed through the first sensing mode (S-Mode), and may calculate a threshold voltage compensation value for reducing or eliminating the threshold voltage deviation between the driving transistors DRT and store the calculated threshold voltage compensation value in the memory 410.

Referring to FIG. 5B, the display device 100 according to embodiments of the present disclosure may determine the mobility of the driving transistor DRT in the corresponding subpixel SP or a change in the mobility based on the voltage Vsen sensed through the second sensing mode F-Mode, and may calculate a mobility compensation value for reducing or eliminating the mobility deviation between the driving transistors DRT and store the calculated mobility compensation value in the memory 410.

When supplying the data voltage Vdata for display driving to the corresponding subpixel SP, the display device 100 may supply the changed data voltage Vata based on the threshold voltage compensation value and the mobility compensation value.

According to the above, the threshold voltage sensing may be performed in the first sensing mode (S-Mode) due to the characteristic of requiring a long sensing time, and the mobility sensing may be performed in the second sensing mode (F-Mode) due to the characteristic of requiring a short sensing time.

Figure 6:
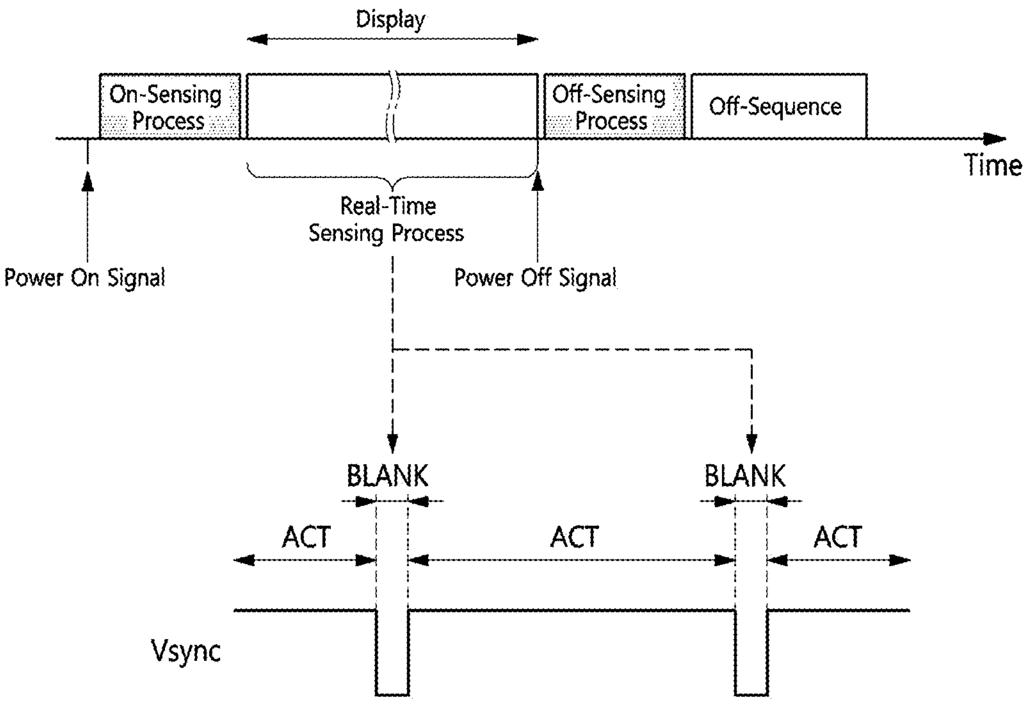
FIG. 6 illustrates various sensing timings of a display device according to embodiments of the present disclosure.

FIG. 6 illustrates various sensing timings of a display device 100 according to embodiments of the present disclosure.

Referring to FIG. 6, when a power-on signal is generated, the display device 100 according to embodiments of the present disclosure may sense the characteristic value of the driving transistor DRT within each subpixel SP disposed on the display panel 110. This sensing process may be referred to as an "on-sensing process."

Referring to FIG. 6, when a power-off signal is generated, the display device 100 according to embodiments of the present disclosure may sense the characteristic value of the driving transistor DRT in each subpixel SP disposed on the display panel 110 before an off-sequence such as turning off the power is performed. This sensing process may be referred to as an "off-sensing process."

Referring to FIG. 6, the display device 100 according to embodiments of the present disclosure may also sense the characteristic values of the driving transistor DRT within each subpixel SP during display driving from when a power-on signal is generated until a power-off signal is generated. This sensing process may be referred to as a "real-time sensing process."

The real-time sensing process may be performed every blank period BLANK between active periods ACT, based on the vertical synchronization signal Vsync.

Since the mobility sensing of the driving transistor DRT requires only a short time, the mobility sensing may be performed in the second sensing mode (F-Mode) among the sensing driving methods.

Since the mobility sensing, which can be performed in the second sensing mode (F-Mode) as a fast mode, requires only a short time, the mobility sensing may be performed in any one of an on-sensing process, an off-sensing process, and a real-time-sensing process.

For example, the mobility sensing, which can be performed in the second sensing mode (F-Mode) as a fast mode, may be performed as a real-time sensing process capable of reflecting the mobility changes in real time during the display driving. That is, the mobility sensing may be performed every blank period during the display driving.

In comparison, the threshold voltage sensing of the driving transistor DRT may require a long saturation time Vsat. Accordingly, the threshold voltage sensing may be performed in the first sensing mode (S-Mode) among the sensing driving methods.

The threshold voltage sensing is required to be performed using timing which does not interfere with the user's viewing. Accordingly, threshold voltage sensing of the driving transistor DRT may be performed after a power-off signal is generated according to a user input, etc., while the display driving is not performed (i.e., a situation in which the user has no intention of viewing). That is, the threshold voltage sensing may be performed as an off-sensing process.

Figure 7:
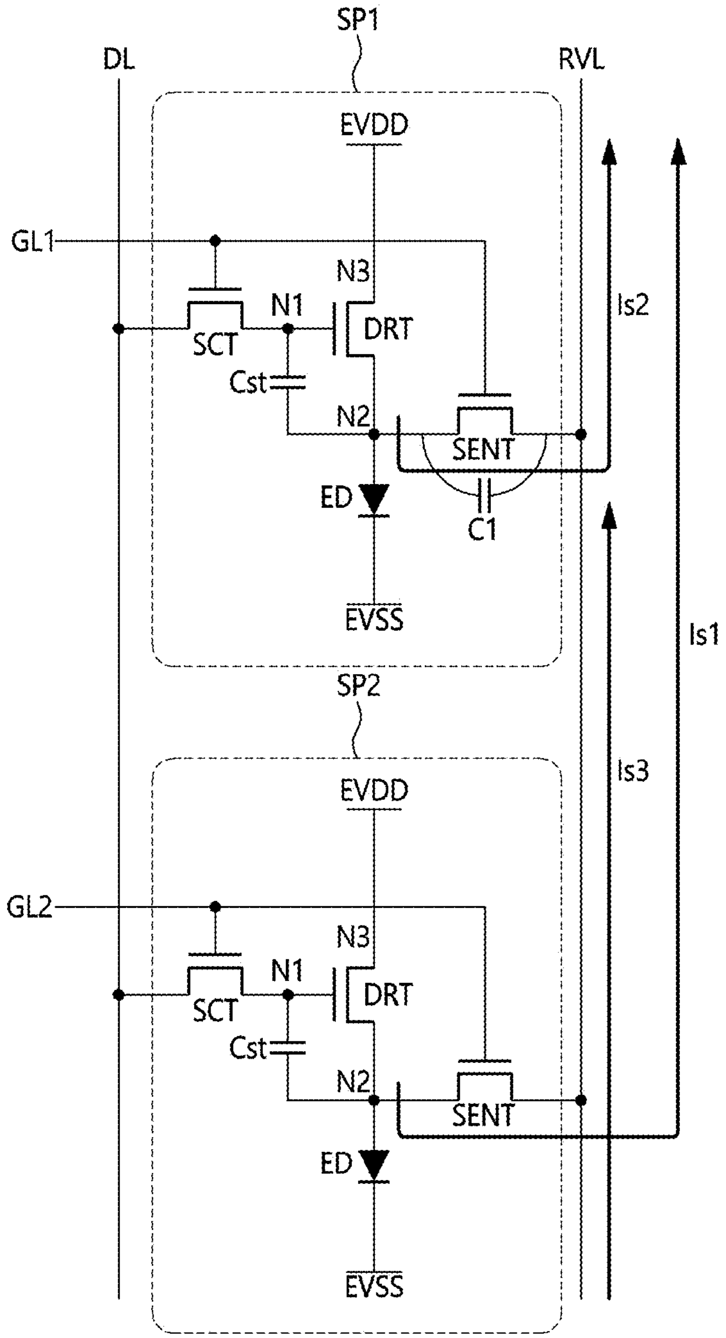
FIG. 7 illustrates a circuit for sensing characteristic values of a driving transistor according to embodiments of the present disclosure.

FIG. 7 illustrates a circuit for sensing characteristic values of a driving transistor according to embodiments of the present disclosure.

Referring to FIG. 7, in order to detect characteristic values for a second subpixel SP2, a turn-on scan signal SCAN may be supplied to a second gate line GL2 electrically connected to the second subpixel SP2.

Therefore, the subpixel electrically connected to the second gate line GL2 supplied with the turn-on scan signal may be turned on, and the characteristic value sensing may be performed for the corresponding subpixel.

In this case, the characteristic value of the second subpixel SP2 may be sensed through a reference voltage line RVL.

Referring to FIG. 7, a first sensing current Is1 may be supplied to the reference voltage line RVL, and the characteristic value of the second subpixel SP2 may be detected based on the first sensing current Is1.

Meanwhile, while the characteristic value sensing is performed for the second subpixel SP2, a first subpixel SP1 or another subpixel may be driven to display a frame. A sensing transistor SENT included in subpixels excluding the second subpixel SP2 may be controlled to be turned off.

However, a parasitic capacitance C1 may be formed between the corresponding sensing transistor SENT and the reference voltage line RVL. The leakage current may flow from subpixels excluding the second subpixel SP2 due to the parasitic capacitance C1. Referring to FIG. 7, there is illustrated a second sensing current Is2 and the third sensing current Is3, which are leakage currents.

Referring to FIG. 7, the second sensing current Is2 and the third sensing current Is3 are represented. While sensing the characteristic value for the second subpixel SP2, the second sensing current Is2 and the third sensing current Is3 may flow through the reference voltage line RVL.

That is, since the second sensing current Is2 and the third sensing current Is3 are leakage currents, the sensing accuracy may be lowered due to the leakage current.

Accordingly, embodiments of the present disclosure may provide a display device 100 and a driving method capable of accurately sensing the characteristic values of subpixels.

Embodiments of the present disclosure may provide a display device 100 and a driving method capable of removing noise from the characteristic values of subpixels.

Embodiments of the present disclosure may provide a display device 100 and a driving method capable of accurately compensating for the luminance of the display panel 110.

Embodiments of the present disclosure may provide a display device 100 and a driving method which enable low power consumption by accurately sensing the characteristic values of subpixels. Hereinafter, this will be explained in detail.

Figure 8:
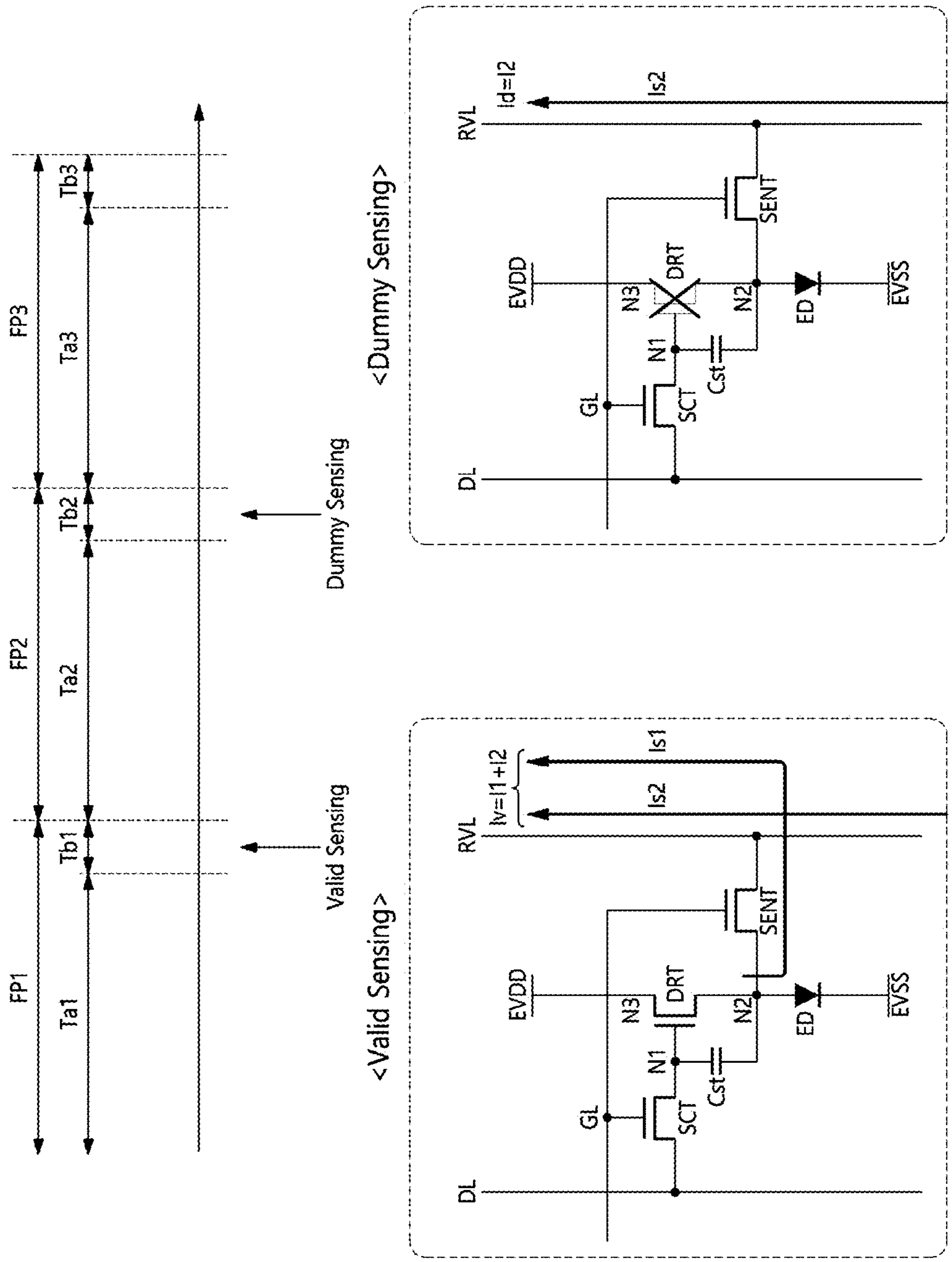
FIG. 8 is a diagram related to a valid sensing and a dummy sensing according to embodiments of the present disclosure.

FIG. 8 is a diagram related to a valid sensing and a dummy sensing according to embodiments of the present disclosure.

After describing the valid sensing and the dummy sensing, it will be described the overall driving method of the display device 100 in detail. Hereinafter, it will be described the valid sensing and the dummy sensing.

A period for driving a plurality of subpixels may include a plurality of frame periods FP.

The plurality of frame periods FP may include a first frame period FP1, a second frame period FP2, and a third frame period FP3.

Each of the plurality of frame periods FP may include an active period Ta and a blank period Tb. The first frame period FP1 may include a first active period Ta1 and a first blank period Tb1. The second frame period FP2 may include a second active period Ta2 and a second blank period Tb2. The third frame period FP3 may include a third active period Ta3 and a third blank period Tb3.

The first frame period FP1 may include a first valid sensing period, which is a period in which a first valid sensing is performed.

The first valid sensing period may be a period in which the valid sensing is performed for a first subpixel SP1 electrically connected to a first reference voltage line RVL during the first frame period FP1. A valid current Iv may be sensed by performing the valid sensing. The valid current Iv may include a first sensing current Is1 and a second sensing current Is2. The first sensing current Is1 may be a current including characteristic value information of a subpixel for which characteristic value sensing is performed. The second sensing current Is2 may be a leakage current.

During the first valid sensing period, the driving transistor DRT of the subpixel for which characteristic value sensing is performed may be in a turn-on state. The first sensing current Is1 may be a current sensed from a subpixel in which characteristic value sensing is performed. The second sensing current Is2 may be a current sensed from a subpixel in which characteristic value sensing is not performed.

Following the characteristics of valid sensing, it will be described the characteristics of dummy sensing.

The second frame period FP2 may be a period during which the dummy sensing is performed on a second subpixel SP2 electrically connected to a first reference voltage line RVL during the second frame period FP2 or the first subpixel SP1. The dummy sensing may be performed and, a dummy current Id may be sensed. The dummy current Id may include a second sensing current Is2. The second sensing current Is2 may be a leakage current.

During the dummy sensing period, the driving transistor DRT of a subpixel for which the characteristic value sensing is performed may be in a turned-off state. Since the driving transistor DRT of the subpixel where dummy sensing is performed is turned off, sensing current may not flow from the subpixel where dummy sensing is performed to the reference voltage line RVL. The second sensing current Is2 may be a current flowing from a subpixel in which characteristic value sensing is not performed.

Since the valid current Iv includes the first sensing current Is1 and the second sensing current Is2, and the dummy current Id includes the second sensing current Is2, the controller 140 may generate final compensation data based on the valid current Iv and the dummy current Id.

The processing method of generating the final compensation data based on data on the valid current Iv and data on the sensing current may be referred to as a CDS. The CDS is an abbreviation for a correlated double sampling. The CDS may also be referred to as a CDS processing or CDS progress. The CDS may also be referred to as CDS data, correlated double sample, etc.

Before a detailed description with reference to FIGS. 9 and 10, it will be briefly described the method of driving the display device 100 as follows. One frame period may include an active period Ta and a blank period Tb. During the blank period Tb, there may be performed the sensing of the characteristics of the driving transistor DRT. The sensing the characteristics of the driving transistor DRT may be performed on a sensing gate line GL, which is one gate line GL among the plurality of gate lines GL. A plurality of subpixels may be electrically connected to the sensing gate line GL. Each of the plurality of subpixels electrically connected to the sensing gate line GL may be electrically connected to one reference voltage line RVL. During the characteristic value sensing period of the driving transistor DRT, each of the plurality of subpixels electrically connected to the sensing gate line GL may be sensing-driven and enable to flow a sensing current to the reference voltage line RVL electrically connected to each of the plurality of subpixels. The above-described sensing method may be applied to both the valid sensing and the dummy sensing. However, there may be a difference in that the driving transistor DRT is in a turn-on state in the valid sensing, and the driving transistor DRT is in a turn-off state in the dummy sensing.

Although the valid sensing and the dummy sensing are performed in each of the plurality of subpixels electrically connected to the sensing gate line GL, the CDS processing through the valid sensing and the dummy sensing may be applied to one reference voltage line RVL. That is, through the valid sensing performed on a specific reference voltage line RVL and the dummy sensing performed on a specific reference voltage line RVL, the compensation data for a subpixel electrically connected to a specific reference voltage line RVL may be generated through CDS processing.

Hereinafter, it will be described a driving method of the display device 100 in more detail.

Figure 9:
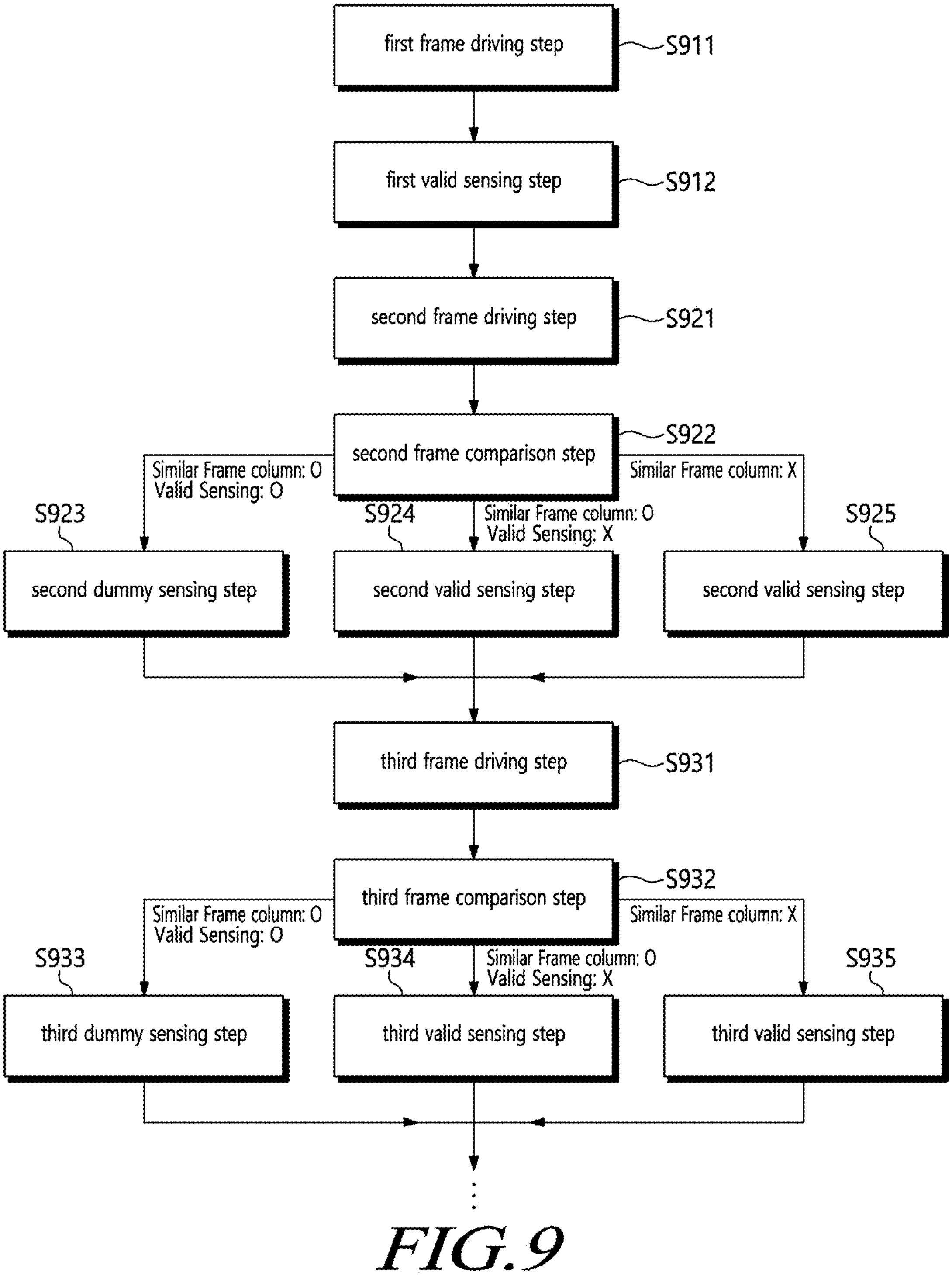
FIG. 9 is a flowchart of a sensing driving method according to embodiments of the present disclosure.

FIG. 9 is a flowchart of a sensing driving method according to embodiments of the present disclosure. FIG. 10 illustrates an example of the sensing driving according to embodiments of the present disclosure.

Figure 10:
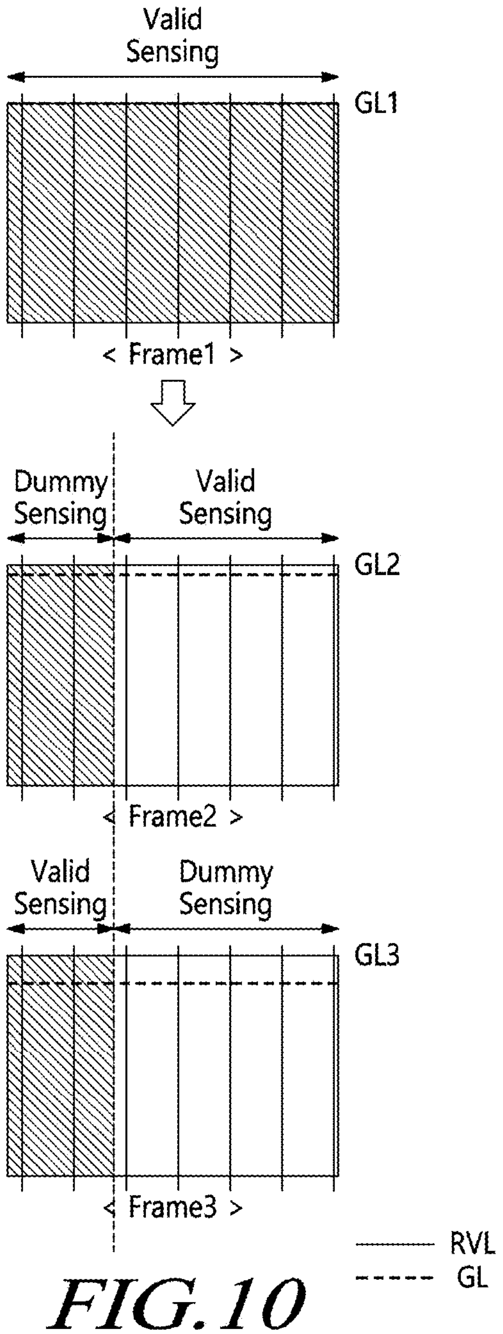
FIG. 10 illustrates an example of the sensing driving according to embodiments of the present disclosure.

Referring to FIGS. 9 and 10, a first frame driving step S911 may be a step in which the first frame Frame1 is driven to be displayed on the display panel 110. The first frame driving step S911 may be a period in which data voltage is supplied to subpixels electrically connected to a first gate line GL1. The first frame driving step S911 may correspond to an active period Ta. Referring to FIG. 10, in the first frame driving step S911, the first frame Frame1 may be displayed on the display panel 110. The first frame Frame1 may be an image expressed in multiple colors, or may be a solid pattern expressed in only a single color. For convenience of explanation, it will be assumed that the first frame Frame1 is a single color (e.g., gray).

Referring to FIGS. 9 and 10, a first valid sensing step S912 may be performed after the first frame driving step S911. In the first valid sensing step S912, the valid sensing may be performed. The first valid sensing step S912 may correspond to a blank period Tb. Referring to FIG. 10, in the first valid sensing step S912, valid sensing may be performed on the subpixel electrically connected to the first gate line GL1.

Referring to FIGS. 9 and 10, a second frame driving step S921 may be performed after the first valid sensing step S912. The second frame driving step S921 may be a step in which the second frame Frame2 is driven to be displayed on the display panel 110. The second frame driving step S921 may be a period in which data voltage is supplied to subpixels electrically connected to a second gate line GL2. The second frame driving step S921 may correspond to the active period Ta. Referring to FIG. 10, in the second frame driving step S921, the second frame Frame2 may be displayed through the display panel 110. The second frame Frame2 may be an image expressed in multiple colors, or may be a solid pattern expressed in only a single color. For convenience of explanation, it is assumed that the left portion of the second frame Frame2 displays the first color (e.g., gray), and the right portion of the second frame Frame2 displays the second color (e.g., white).

Referring to FIGS. 9 and 10, a second frame comparison step S922 may be performed after the second frame driving step S921. The second frame comparison step S922 may be a step of comparing the first frame Frame1 and the second frame Frame2, and determining whether a first column line of the first frame Frame1 and a first column line of the second frame Frame2 are similar frame columns or dissimilar frame columns.

A reference for determining whether the first column line of the first frame Frame1 and the first column line of the second frame Frame2 are similar frame columns may be set in various ways, and will be exemplified as an example below.

For example, one frame may include a plurality of column-unit frames. The first frame Frame1 may include a first frame column, a second frame column, and so on from the leftmost, and the n-th frame column may be the rightmost frame column. One frame may be expressed by lights arranged in a matrix form. For example, the matrix form means n*m form, where n may be the number of columns and m may be the number of rows. One frame column may be a frame expressed by lights disposed in one column of one frame. If one frame is in the form of n*m, the number of columns in one frame may be n. The first frame column of one frame may be expressed as a first column line, and the second frame column of one frame may be expressed as a second column line. The display device 100 according to embodiments of the present disclosure may determine similarity by comparing the first column line of the first frame Frame1 and the first column line of the second frame Frame2 on a column-by-column basis.

For example, if the first column line of the first frame Frame1 and the first column line of the second frame Frame2 are the same, there may be determined that the first frame column of the first frame Frame1 and the first frame column of the second frame Frame2 are the same or similar frame columns.

For example, if the sum of grayscales for each subpixel of the first column line of the first frame Frame1 is the same as the sum of grayscales for each subpixel of the first column line of the second frame Frame2, there may be determined that the first frame column of the first frame Frame1 and the first frame column of the second frame Frame2 are the same or similar frame columns. The first column line of the first frame Frame1 and the first column line of the second frame Frame2 have been described as examples, and there may be performed the determination of whether the frame columns are the same on the remaining column lines other than the first column line.

For example, if a difference of the grayscales for each subpixel of the first column line of the first frame Frame1 and a difference of the grayscales for each subpixel of the first column line of the second frame Frame2 are smaller than a predetermined reference value, the first column line of the first frame Frame1 and the first column line of the second frame Frame2 may be determined to be similar frame columns.

For example, if the sum of grayscales of the subpixels in the first column line of the first frame Frame1) and the sum of grayscales of the subpixels in the first column line of the second frame Frame2 are each smaller than a specific reference value, there may be determined that the first column line of the first frame Frame1 and the first column line of the second frame Frame2 are similar frame columns.

For example, if a total luminance of the first column line of the first frame Frame1 is similar to a total luminance of the first column line of the second frame Frame2, the first column of the first frame Frame1 The line and the first column line of the second frame Frame2 may be determined to be similar frame columns.

Hereinafter, it will be separately described the characteristics of the cases where the first column line of the first frame Frame1 and the first column line of the second frame Frame2 are similar frame columns and dissimilar frame columns, respectively.

If the first column line of the first frame Frame1 and the first column line of the second frame Frame2 are similar frame columns, the characteristics are as follows. If the first column line of the first frame Frame1 and the first column line of the second frame Frame2 are similar frame columns, a first sensing value obtained after the first frame Frame1 progresses may be similar to a second sensing value obtained after the second frame Frame2 progresses. Therefore, if the first column line of the first frame Frame1 and the first column line of the second frame Frame2 are similar frame columns, the CDS technology may be applied.

For example, the valid sensing may be performed on a first subpixel during a first frame period FP1, and accordingly, the first sensing data for the first sensing value may be stored in the memory 410. The dummy sensing may be performed on the first subpixel during a second frame period FP2, and accordingly, second sensing data for the second sensing value may be stored in the memory 410. The controller 140 may read the first sensing data and the second sensing data, and the controller 140 may generate final compensation data based on the first sensing data and the second sensing data. The data voltage compensated based on the final compensation data may be supplied to the first subpixel and the second subpixel. Accordingly, there may be improved the compensation accuracy for the first subpixel and the second subpixel.

In the case that the first column line of the first frame Frame1 and the first column line of the second frame (Frame2) are dissimilar frame columns, the characteristics are as follows. If the first column line of the first frame Frame1 and the first column line of the second frame Frame2 are non-similar frame columns, a first sensing value obtained after the first frame Frame1 progresses may be dissimilar to a second sensing value obtained after the second frame Frame2 progresses. Therefore, if the first column line of the first frame Frame1 and the first column line of the second frame Frame2 are dissimilar frame columns, the accurate sensing values may not be acquired even if CDS technology is applied.

After determining whether the first column line of the first frame Frame1 and the first column line of the second frame Frame2 are similar frame columns or dissimilar frame columns, there may be performed the valid sensing or the Dummy sensing. Next, it will be described the valid sensing and the dummy sensing.

After the second frame comparison step S922, a second dummy sensing step S923 or a second valid sensing step S924 and S925 may be performed.

Referring to FIGS. 9 and 10, if the first column line of the first frame Frame1 and the first column line of the second frame Frame2 are similar frame columns, but the valid sensing has been performed on a first subpixel SP1, the second dummy sensing step S923 may be performed after the second frame comparison step S922. The second dummy sensing step S923 may be a step in which the dummy sensing is performed on a second subpixel SP2 disposed in the first column line. For example, referring to FIG. 10, when characteristic value sensing is performed on a second gate line GL2, the dummy sensing may be performed on the subpixel disposed in the first column line. Referring to FIG. 10, when characteristic value sensing is performed on the second gate line GL2, the dummy sensing may be performed on the subpixel disposed in the second column line.

It will be described a method of generating the final compensation data after performing the second dummy sensing step S923. The valid sensing may be performed on the first subpixel during the first frame period FP1, and accordingly, the first sensing data for the first sensing value may be stored in the memory 410. The dummy sensing may be performed on the first subpixel during the second frame period FP2, and accordingly, the second sensing data for the second sensing value may be stored in the memory 410. The controller 140 may read the first sensing data and the second sensing data, and the controller 140 may generate the final compensation data based on the first sensing data and the second sensing data. The data voltage compensated based on the final compensation data may be supplied to the first subpixel and the second subpixel. Accordingly, there may be improved the compensation accuracy for the first subpixel and the second subpixel.

Referring to FIGS. 9 and 10, in the case that the first column line of the first frame Frame1 and the first column line of the second frame Frame2 are similar frame columns, but the valid sensing is not performed for the first subpixel SP1, the second valid sensing step S924 may be performed after the second frame comparison step S922. The second valid sensing step S924 may be a step in which valid sensing is performed on the second subpixel SP2 disposed in the first column line. For example, referring to FIG. 10, when the characteristic value sensing is performed on the second gate line GL2, the valid sensing may be performed on the subpixel disposed in a third column line, the valid sensing may be performed on the subpixels arranged in a fourth column line, the valid sensing may be performed on the subpixel arranged in a fifth column line, the valid sensing may be performed on the subpixel arranged in a sixth column line, and the valid sensing may be performed on the subpixel arranged in a seventh column line.

After performing the second valid sensing step S924, the final compensation data may be applied to the second subpixel through the sensing value obtained through valid sensing.

Referring to FIG. 9, if the first column line of the first frame Frame1 and the first column line of the second frame Frame2 are dissimilar frame columns, the second valid sensing step S925 may be performed after the second frame comparison step S922. The second valid sensing step S925 may be a step in which the valid sensing is performed on the second subpixel SP2 disposed in the first column line.

After the second valid sensing step S925 is performed, the final compensation data may be applied to the second subpixel through the sensing value obtained through valid sensing.

Afterwards, a third frame driving step S931 may be performed. The third frame driving step S931 may be a step in which t third frame Frame3 is driven to be displayed on the display panel 110. The third frame driving step S931 may correspond to a period in which the data voltage is supplied to subpixels electrically connected to the third gate line GL. The third frame driving step S931 may correspond to an active period Ta. Referring to FIG. 10, in the third frame driving step S931, the third frame Frame3 may be displayed through the display panel 110. For convenience of explanation, it is assumed that the right portion of the third frame Frame3 displays a first color (e.g., gray), and the left portion of the third frame Frame3 displays a second color (e.g., white).

A third frame comparison step S932 may be performed after the third frame driving step S931. The third frame comparison step S932 may be the same as the second frame comparison step S922. The third frame comparison step S932 may be a step of comparing the second frame Frame2 and the third frame Frame3, and determining whether the first column line of the second frame Frame2 and the first column line of the third frame Frame3 are similar frame columns or dissimilar frame columns.

After the third frame comparison step S932, a third dummy sensing step S933 or a third valid sensing step S934 and S935 may be performed.

Referring to FIGS. 9 and 10, if the first column line of the second frame Frame2 and the first column line of the third frame Frame3 are similar frame columns, and the valid sensing has been performed for the second subpixel SP2, the third dummy sensing step S933 may be performed after the third frame comparison step S932. For example, referring to FIG. 10, when the sensing of the characteristic value is performed on the third gate line GL, the dummy sensing may be performed on the subpixel disposed on the third column line. In addition, the dummy sensing may be performed on a subpixel arranged in the fourth column line, the dummy sensing may be performed on the subpixel arranged in the fifth column line, the dummy sensing may be performed on the subpixel arranged in the sixth column line, and the dummy sensing may be performed on the subpixel arranged in the seventh column line.

Referring to FIGS. 9 and 10, if the first column line of the second frame Frame2 and the first column line of the third frame Frame3 are similar frame columns, and the dummy sensing is performed on the third subpixel, the third valid sensing Step S934 may be performed after the third frame comparison step S932. The third valid sensing step may be a step in which the valid sensing is performed on the third subpixel arranged in the second column line during a third frame period FP3. For example, referring to FIG. 10, when the characteristic value sensing is performed on the third gate line GL, the valid sensing may be performed on the subpixel disposed in the first column line. Referring to FIG. 10, when characteristic value sensing is performed on the third gate line GL, the valid sensing may be performed on the subpixel disposed on the second column line.

Referring to FIG. 9, if the first column line of the second frame Frame2 and the first column line of the third frame Frame3 are dissimilar frame columns, the third valid sensing step S935 may be performed after the third frame comparison step S932. The third valid sensing step S935 may be a step in which the valid sensing is performed on the third subpixel electrically connected to the third gate line GL.

Afterwards, a fourth frame driving step may proceed, and it will be omitted the repeated descriptions.

There has been described the driving method of the display device 100 in detail. The driving method of the display device 100 may be summarized as follows.

The driving method of the display device 100 may include a first valid sensing step S912 of performing the valid sensing on a first subpixel SP1 disposed in a first column line during a first frame period FP1, a dummy sensing step S923 in which the dummy sensing is performed on a second subpixel SP2 or the first subpixel SP1 disposed in the first column line during a second frame period FP2, and a compensation data generation step of generating the final compensation data based on valid data for valid sensing and dummy data for dummy sensing.

If the first column line of the first frame Frame1 and the first column line of the second frame Frame2 are similar frame columns, and the valid sensing is performed on the first subpixel SP1, the dummy sensing may be performed on the second subpixel SP2 in the dummy sensing step. This may be the second dummy sensing step S923.

If the first column line of the second frame Frame2 and the first column line of the third frame Frame3 are similar frame columns, and the dummy sensing is performed on the second subpixel SP2, there may be further included a second valid sensing period in which the valid sensing is performed on the third subpixel disposed in the first column line during the third frame period FP3.

If the first column line of the second frame Frame2 and the first column line of the third frame Frame3 are dissimilar frame columns, there may be further included a second valid sensing period in which valid sensing is performed on the third subpixel disposed in the first column line disposed on the first column line during the third frame period FP3.

Accordingly, it is possible to accurately sense the characteristic values of the subpixel.

Accordingly, it is possible to remove noise from the characteristic values of the subpixel.

Accordingly, it is possible to accurately compensate the luminance of the display panel 110.

Accordingly, it is possible to implement the low power consumption by accurately sensing the characteristics of the subpixel.

Figure 11:
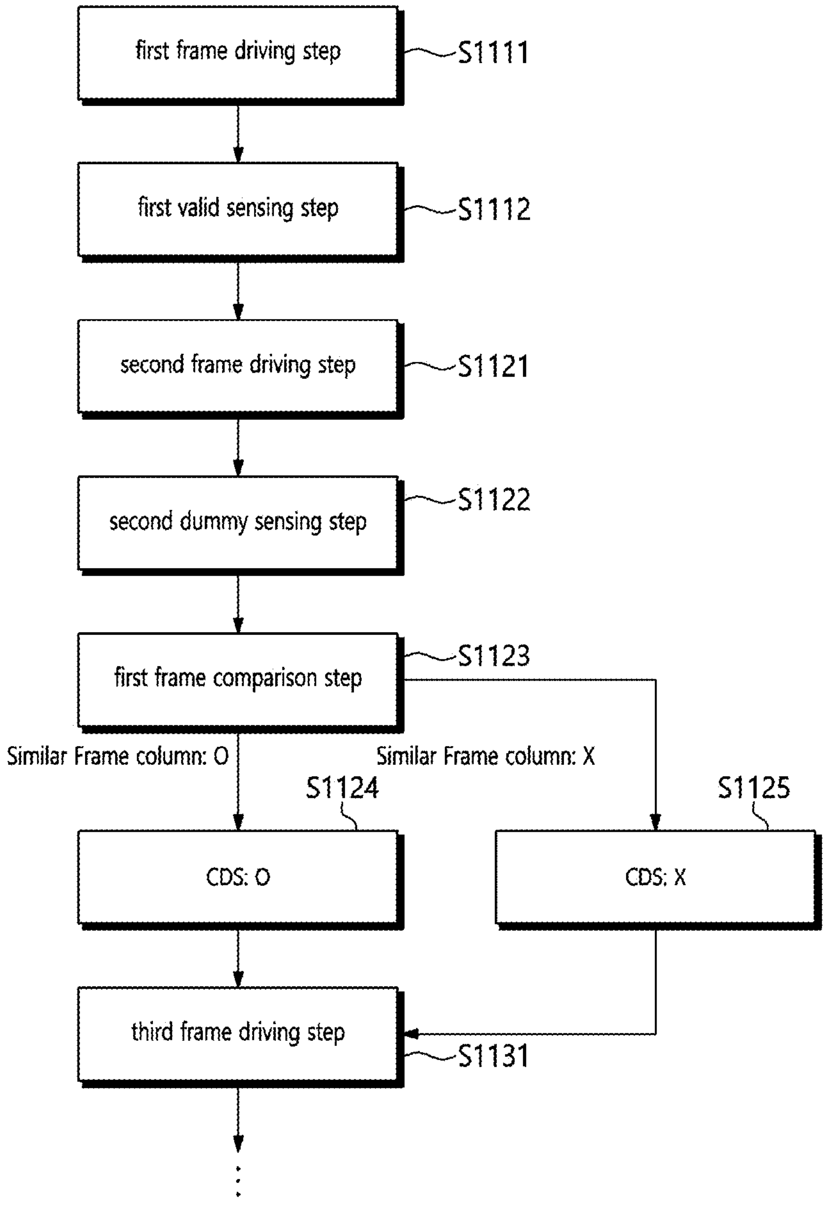
FIG. 11 is a flowchart of a sensing driving method according to embodiments of the present disclosure.
Figure 12:
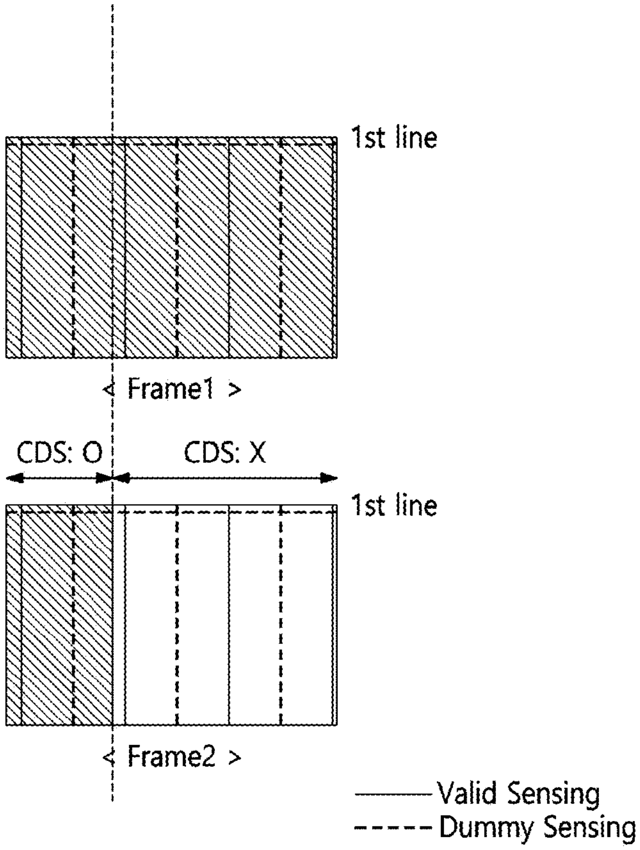
FIG. 12 illustrates an example of the sensing driving according to embodiments of the present disclosure.

FIG. 11 is a flowchart of a sensing driving method according to embodiments of the present disclosure. FIG. 12 illustrates an example of the sensing driving according to embodiments of the present disclosure.

The display device 100 may be driven by the valid sensing and the dummy sensing simultaneously, and the valid sensing and the dummy sensing may be alternately performed on odd-numbered column lines and even-numbered column lines. For example, when sensing is performed on a first gate line, the valid sensing may be performed on the first column line and the dummy sensing may be performed on a second column line. When sensing is performed on the second gate line, the dummy sensing may be performed on the first column line and the valid sensing may be performed on the second column line.

For convenience of explanation, the steps were divided based on "even column lines." Although the steps are explained based on the "even column line," the operation of the "odd column line" when driving the "even column line" will also be described. For convenience of explanation, the driving step of the "odd column line" is not named as a step.

Referring to FIGS. 11 and 12, a first frame driving step S1111 may be a step in which the first frame Frame1 is driven to be displayed on the display panel 110. The first frame driving step S1111 may be a period in which a data voltage is supplied to a first gate line GL1. The first frame driving step S1111) may correspond to an active period Ta. Referring to FIG. 12, the first frame Frame1 may be displayed through the display panel 110. For convenience of explanation, there is exemplified that the first frame Frame1 displays a single color, which is the first color (e.g., gray).

Referring to FIGS. 11 and 12, the first valid sensing step S1112 may be performed after the first frame driving step S1111. In the first valid sensing step S1112, the valid sensing may be performed. The first valid sensing step S1112 may correspond to a blank period Tb. Referring to FIG. 12, the valid sensing may be performed on a subpixel electrically connected to a first gate line GL1. For example, seven column lines may be arranged on the display panel. The valid sensing may be performed in a subpixel electrically connected to the first gate line GL1 and disposed in an even-numbered column line.

The first valid sensing step S1112 may be a step in which the valid sensing is performed, and the dummy sensing may be performed on the odd-numbered column line at the same time as the valid sensing of the first valid sensing step S1112. Referring to FIG. 12, the dummy sensing may be performed in a subpixel electrically connected to the first gate line GL1 and disposed in an odd-numbered column line. In the first valid sensing step S1112, the dummy sensing is performed in odd-numbered column lines and the valid sensing is performed in even-numbered column lines, so that the first valid sensing step S1112 may also be referred to as a first sensing step.

Referring to FIGS. 11 and 12, a second frame driving step S1121 may be performed after the first valid sensing step S1112. The second frame driving step S1121 may be a step in which the second frame Frame2 is driven to be displayed on the display panel 110. The second frame driving step S1121 may be a period in which data voltage is supplied to a subpixel electrically connected to the first gate line GL1. The second frame driving step S1121 may correspond to an active period Ta. Referring to FIG. 10, in the second frame driving step S1121, the second frame Frame2 may be displayed through the display panel 110. For convenience of explanation, there is exemplified that the second frame Frame2 displays a first color (e.g., gray) on the right and a second color (e.g., white) on the left.

Referring to FIGS. 11 and 12, a second dummy sensing step S1122 may be performed after the second frame driving step S1121. Referring to FIG. 12, the valid sensing may be performed on a subpixel electrically connected to the first gate line GL1. For example, seven column lines may be arranged on the display panel. The dummy sensing may be performed in a subpixel electrically connected to the first gate line GL1 and disposed in an even-numbered column line.

The second dummy sensing step S1122 may be a step in which dummy sensing is performed. Simultaneously with the dummy sensing in the second dummy sensing step S1122, the valid sensing may be performed on the odd-numbered column line. Referring to FIG. 12, the valid sensing may be performed in a subpixel electrically connected to the first gate line GL1 and disposed in an odd-numbered column line. In the second dummy sensing step S1122, the valid sensing may be performed in the odd-numbered column line and the dummy sensing may be performed in the even-numbered column line, so the second dummy sensing step S1122 may also be referred to as a second sensing step.

Referring to FIGS. 11 and 12, a first frame comparison step S1133 may be performed after the second dummy sensing step S1122. The first frame comparison step S1133 may be a step of comparing the first frame Frame1 and the second frame Frame2, and determining whether a first column line of the first frame Frame1 and a first column line of the second frame Frame2 are similar frame columns or dissimilar frame columns.

After the first frame comparison step S1133, there may be performed a compensation data generation step of generating the compensation data for the first subpixel SP1.

In the first frame comparison step S1133, if the first column line of the first frame Frame1 and the first column line of the second frame Frame2 are similar frame columns S1124, the CDS processing may proceed. During the compensation data generation step, the final compensation data may be generated by subtracting the dummy data from the valid data.

If the first column line of the first frame Frame1 and the first column line of the second frame Frame2 are dissimilar frame columns S1125, the CDS processing may not proceed. The final compensation data may be the valid data or the valid sensing data.

Afterwards, a third frame driving step S1131 may proceed, and it will be omitted the repeated descriptions.

In summary, embodiments of the present disclosure may provide a driving method of a display device 100 including a first valid sensing step S1112 of performing the valid sensing on a first subpixel SP1 disposed in a first column line during a first frame period FP1, a dummy sensing step S1122 in which the dummy sensing is performed on a second subpixel SP2 or the first subpixel SP1 disposed in the first column line during a second frame period FP2, and a compensation data generation step S1124 and S1125 of generating the final compensation data based on the valid data for valid sensing and the dummy data for dummy sensing.

There may be further included a frame comparison step S1123 performed between the dummy sensing step S1112 and the compensation data generation step S1124 and S1125. The frame comparison period S1123 may be a period for comparing the first frame of the first frame period and the second frame of the second frame period to determine whether the first frame and the second frame are similar frame columns or dissimilar frame columns.

If the first frame and the second frame are similar frame columns (S1124), the final compensation data may be generated by subtracting the dummy data from the valid data during the compensation data generation step.

If the first frame and the second frame are dissimilar frame columns (S1125), the final compensation data may be the valid data or the valid sensing data.

Accordingly, it is possible to accurately sense the characteristic values of the subpixel.

Accordingly, it is possible to remove noise from the characteristic values of the subpixel.

Accordingly, it is possible to accurately compensate the luminance of the display panel 110.

Accordingly, it is possible to implement the low power consumption by accurately sensing the characteristics of the subpixel.

Figure 13:
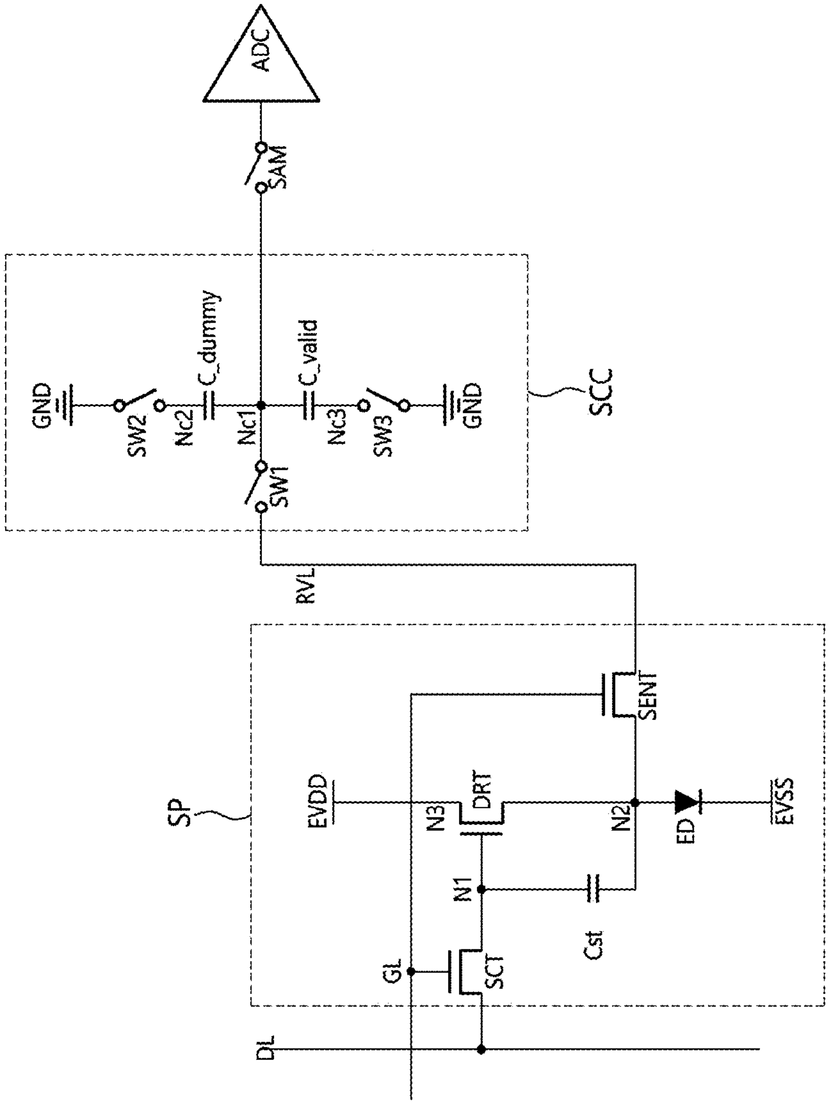
FIG. 13 illustrates a subpixel and a sensing control circuit according to embodiments of the present disclosure.

FIG. 13 illustrates a subpixel and a sensing control circuit SCC according to embodiments of the present disclosure.

Figure 14:
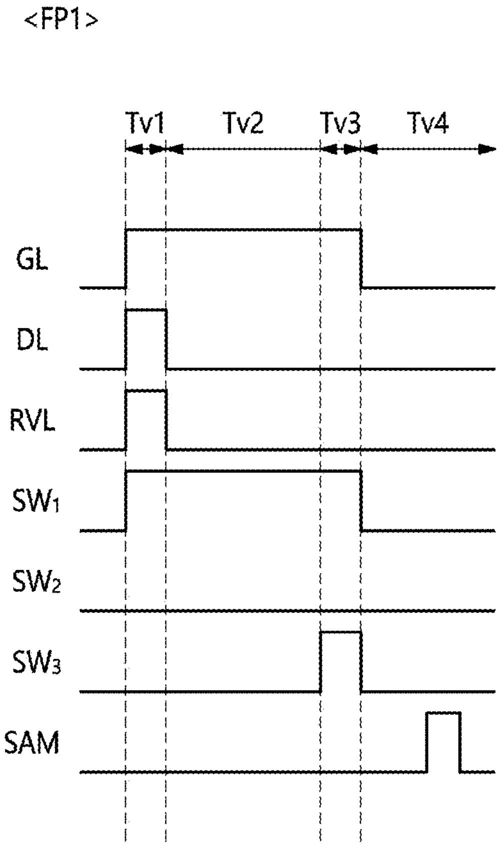
FIG. 14 is a timing diagram for driving a sensing control circuit according to embodiments of the present disclosure.

FIG. 14 is a timing diagram for driving a sensing control circuit SCC according to embodiments of the present disclosure.

Figure 15:
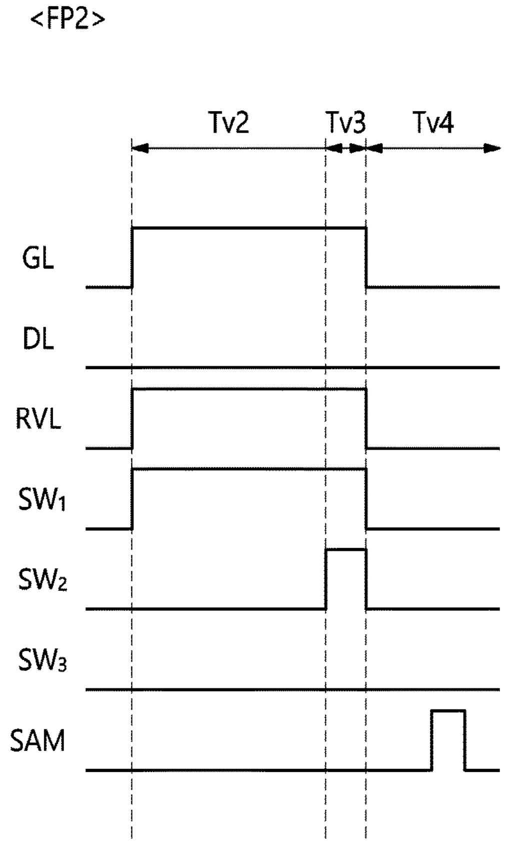
FIG. 15 is a timing diagram for driving a sensing control circuit according to embodiments of the present disclosure.

FIG. 15 is a timing diagram for driving a sensing control circuit SCC according to embodiments of the present disclosure.

The sensing control circuit SCC may include a first switch SW1, a dummy capacitor C_dummy, a second switch SW2, a valid capacitor C_valid, and a third switch SW3.

The first switch SW1 may be electrically connected between a first reference voltage line RVL and a first shared node Nc1.

The dummy capacitor C_dummy may be electrically connected between the first shared node Nc1 and a second shared node Nc2.

The second switch SW2 may be electrically connected between the dummy capacitor C_dummy and a ground node GND.

The valid capacitor C_valid may be electrically connected between the first shared node Nc1 and a third shared node Nc3.

The third switch SW3 may be electrically connected between the valid capacitor C_valid and the ground node GND.

Referring to FIGS. 14 and 15, the period of driving the sensing control circuit SCC may include a first valid sensing period and a dummy sensing period.

Referring to FIG. 14, the first valid sensing period may include an initialization period Tv1, a tracking period Tv2, a valid sensing period Tv3, and a sampling period Tv4. The first valid sensing period may proceed during a first frame period.

During the initialization period Tv1, a high-level signal may be supplied to a gate line GL, so that the scan transistor and the sensing transistor SENT may be turned on. In this case, an initialization voltage may be supplied through the data line and a reference voltage line RVL. In addition, the first switch SW1 may be in a turn-on state. The initialization characteristics of the initialization period Tv1 may be the same as those of the initialization period Tinit shown in FIG. 5B.

During the tracking period Tv2, a high-level signal may be supplied to the gate line GL, so that the scan transistor and the sensing transistor SENT may be turned on. In this case, voltage may not be supplied through the data line and reference voltage line RVL. The first switch SW1 may be in a turn-on state. The voltage of a second node may increase during the tracking period Tv2. The tracking characteristics of the tracking period Tv2 may be the same as the tracking characteristics of the tracking period Ttrack shown in FIG. 5B.

The valid sensing period Tv3 may be a period in which the first switch SW1 and the third switch SW3 are turned on and the valid capacitor C_valid can be charged with voltage. The voltage stored in the valid capacitor C_valid may be sensed during the sampling period Tv4.

The sampling period Tv4 may be a period in which the sampling switch is turned on and the valid sensing is performed. The voltage stored in the valid capacitor C_valid may be sensed during the sampling period Tv4.

After the sampling period Tv4, a first sensing voltage or first sensing data may be stored in the memory 410. The controller 140 may read the first sensing data from the memory 410. The controller 140 may generate the compensation data using only the first sensing data sensed in the sampling period Tv4. However, if the CDS processing is performed through sensing data obtained from the dummy sensing, the controller 140 may generate more accurate compensation data. Hereinafter, it will be described an operation of the dummy sensing.

Referring to FIG. 15, the dummy sensing period may include a dummy sensing preparation period Td1, a dummy capacitor charging period Td2, and a dummy sampling period Td3.

The dummy sensing preparation period Td1 may be a period during which leakage current flows through the reference voltage line RVL. At this time, the first switch SW1 may be in a turn-on state.

The dummy capacitor charging period Td2 may be a period in which the first switch SW1 and the second switch SW2 are turned on and the dummy capacitor C_dummy can be charged with voltage. The leakage current may be charged in the dummy capacitor C_dummy during the dummy capacitor charging period Td2.

The dummy sampling period Td3 may be a period in which the sampling switch is turned on and the dummy sensing is performed. The voltage stored in the dummy capacitor C_dummy may be sensed during the dummy sampling period Td3.

After the dummy sampling period Td3, the second sensing voltage or the second sensing data may be stored in the memory 410. The controller 140 may read the second sensing data and the first sensing data from the memory 410. The controller 140 may perform the CDS processing based on the first sensing data and the second sensing data. Accordingly, the controller 140 may generate the final compensation data based on the first sensing data and the second sensing data.

The driving method of the sensing control circuit SCC may be applicable to both the driving method of the display device 100 shown in FIG. 9 and the driving method of the display device 100 shown in FIG. 11.

Embodiments of the present disclosure described above are briefly described as follows.

A display device according to embodiments of the present disclosure may include a display panel on which a plurality of subpixels are disposed, and a data driving circuit configured to drive the display panel. In this case, the plurality of subpixels may include a driving transistor, a scan transistor, and a sensing transistor, where the scan transistor is for being electrically connected between a first node, which is a gate node of the driving transistor, and a data line, the driving transistor is for being electrically connected between a second node and a third node, and the sensing transistor is for being electrically connected between the second node and a reference voltage line. A period during which the plurality of subpixels are driven may include a first valid sensing period in which a valid sensing is performed on a first subpixel electrically connected to a first reference voltage line during a first frame period, and a dummy sensing period in which a dummy sensing is performed on the first subpixel or a second subpixel electrically connected to the first reference voltage line during a second frame period.

The driving transistor included in the first subpixel or the second subpixel may be in a turn-off state during the dummy sensing period.

The period during which the plurality of subpixels are driven may further include a frame comparison period between the first valid sensing period and the dummy sensing period, wherein the frame comparison period may be a period for comparing a first frame of the first frame period and a second frame of the second frame period, and determining whether a first column line of the first frame and a first column line of the second frame are similar frame columns or dissimilar frame columns.

If the first column line of the first frame and the first column line of the second frame are the similar frame columns and the valid sensing is performed on the first subpixel, the dummy sensing may be performed on the second subpixel in the dummy sensing period.

If the first column line of the second frame and the first column line of a third frame are the similar frame columns and the dummy sensing is performed on the second subpixel, the period during which the plurality of subpixels are driven may further include a second valid sensing period in which the valid sensing is performed on a third subpixel electrically connected to the first reference voltage line during a third frame period.

If the first column line of the second frame and the first column line of a third frame are the dissimilar frame columns, the period during which the plurality of subpixels are driven may further include a second valid sensing period in which the valid sensing is performed on a third subpixel electrically connected to the first reference voltage line during a third frame period.

The period during which the plurality of subpixels are driven may further include a frame comparison period between the dummy sensing period and a compensation data generation period, wherein the frame comparison period may be a period for comparing a first frame of the first frame period and a second frame of the second frame period, and determining whether a first column line of the first frame and a first column line of the second frame are similar frame columns or dissimilar frame columns.

If the first column line of the first frame and the first column line of the second frame are the similar frame columns, a final compensation data may be generated by subtracting dummy data from valid data during a compensation data generation period.

If the first column line of the first frame and the first column line of the second frame are the dissimilar frame columns, a final compensation data generated during a compensation data generation period may be valid sensing data.

The display devices according to embodiments of the present disclosure may further include a sensing control circuit electrically connected between a sampling switch included in the data driving circuit and the first reference voltage line. The sensing control circuit may include a first switch electrically connected between the first reference voltage line and a first shared node, a dummy capacitor electrically connected to the first shared node, a second switch electrically connected between the dummy capacitor and a ground node, a valid capacitor electrically connected to the first shared node, and a third switch electrically connected between the valid capacitor and the ground node.

The first valid sensing period may include a valid capacitor charging period during which the first switch and the third switch are turned on and the valid capacitor is charged with a voltage, and a valid sampling period during which the sampling switch is turned on and the valid sensing is performed.

The dummy sensing period may include a dummy capacitor charging period during which the first switch and the second switch are turned on and the dummy capacitor is charged with a voltage, and a dummy sampling period during which the sampling switch is turned on and the dummy sensing is performed.

A driving method of a display device according to embodiments of the present disclosure may include performing a valid sensing on a first subpixel disposed in a first column line during a first frame period, performing a dummy sensing on the first subpixel or a second subpixel disposed in the first column line during a second frame period, and generating final compensation data based on valid data for the valid sensing and dummy data for the dummy sensing.

The driving method of a display device according to embodiments of the present disclosure may further include a frame comparison performed between the performing a valid sensing and performing a dummy sensing, wherein the frame comparison may include comparing a first frame of the first frame period and a second frame of the second frame period, and determining whether a first column line of the first frame and a first column line of the second frame are similar frame columns or dissimilar frame columns.

If the first column line of the first frame and the first column line of the second frame are the similar frame columns and the valid sensing is performed on the first subpixel, the dummy sensing may be performed on the second subpixel in performing a dummy sensing.

If the first column line of the second frame and the first column line of a third frame are the similar frame columns and the dummy sensing is performed on the second subpixel, the driving method may further include a second valid sensing operation in which the valid sensing is performed on a third subpixel electrically connected to a first reference voltage line during a third frame period.

If the first column line of the second frame and the first column line of a third frame are the dissimilar frame columns, the driving method may further include a second valid sensing operation in which in which the valid sensing is performed on a third subpixel electrically connected to a first reference voltage line during a third frame period.

The driving method of a display device according to embodiments of the present disclosure may further include a frame comparison performed between the performing a dummy sensing and the generating final compensation data, wherein the frame comparison may include comparing a first frame of the first frame period and a second frame of the second frame period, and determining whether a first column line of the first frame and a first column line of the second frame are similar frame columns or dissimilar frame columns.

If the first column line of the first frame and the first column line of the second frame are the similar frame columns, the generating final compensation data may include generating the final compensation data by subtracting the dummy data from the valid data during generating final compensation data.

If the first column line of the first frame and the first column line of the second frame are the dissimilar frame columns, the final compensation data may be the valid data.

According to embodiments of the present disclosure, it is possible to provide a display device and a driving method thereof capable of accurately sensing the characteristics of a subpixel.

According to embodiments of the present disclosure, it is possible to provide a display device and a driving method thereof capable of removing noise from the characteristics of a subpixel.

According to embodiments of the present disclosure, it is possible to provide a display device and a driving method thereof capable of accurately compensating for the luminance of a display panel.

According to embodiments of the present disclosure, it is possible to provide a display device and a driving method thereof capable of low power consumption by accurately sensing the characteristics of subpixels.

The above description has been presented to enable any person skilled in the art to make, use and practice the technical features of the present disclosure, and has been provided in the context of one or more particular example applications and their example requirements. Various modifications, additions and substitutions to the described embodiments will be readily apparent to those skilled in the art, and the principles described herein may be applied to other embodiments and applications without departing from the scope of the present disclosure. The above description and the accompanying drawings provide examples of the technical features of the present disclosure for illustrative purposes. In other words, the disclosed embodiments are intended to illustrate the scope of the technical features of the present disclosure. Thus, the scope of the present disclosure is not limited to the embodiments shown, but is to be accorded the widest scope consistent with the claims. The scope of protection of the present disclosure should be construed based on the following claims, and all technical features within the scope of equivalents thereof should be construed as being included within the scope of the present disclosure.

What is claimed is:

1. A display device, comprising:

a display panel on which a plurality of subpixels are disposed; and a data driving circuit configured to drive the display panel, wherein the plurality of subpixels include a driving transistor, a scan transistor, and a sensing transistor, wherein:

the scan transistor is for being electrically connected between a first node, which is a gate node of the driving transistor, and a data line;

the driving transistor is for being electrically connected between a second node and a third node; and the sensing transistor is for being electrically connected between the second node and a reference voltage line, wherein a period during which the plurality of subpixels are for being driven includes:

a first valid sensing period in which a valid sensing is for being performed on a first subpixel electrically connected to a first reference voltage line during a first frame period; and a dummy sensing period in which a dummy sensing is for being performed on the first subpixel or a second subpixel electrically connected to the first reference voltage line during a second frame period, and wherein, during the first frame period, a first frame is displayed on the display panel, and, during the second frame period, a second frame, consecutive to the first frame, is displayed on the display panel.

2. The display device of claim 1, wherein the driving transistor included in the first subpixel or the second subpixel is configured to be in a turn-off state during the dummy sensing period.

3. The display device of claim 1, wherein the period during which the plurality of subpixels are for being driven further includes a frame comparison period between the first valid sensing period and the dummy sensing period, wherein the frame comparison period is a period for comparing the first frame of the first frame period and the second frame of the second frame period, and determining whether a first column line of the first frame and a first column line of the second frame are similar frame columns or dissimilar frame columns.

4. The display device of claim 3, wherein, if the first column line of the first frame and the first column line of the second frame are the similar frame columns and the valid sensing is performed on the first subpixel, the dummy sensing is for being performed on the second subpixel in the dummy sensing period.

5. The display device of claim 3, wherein, if the first column line of the second frame and the first column line of a third frame are the similar frame columns and the dummy sensing is performed on the second subpixel, the period during which the plurality of subpixels are for being driven further includes a second valid sensing period in which the valid sensing is for being performed on a third subpixel electrically connected to the first reference voltage line during a third frame period.

6. The display device of claim 3, wherein, if the first column line of the second frame and the first column line of a third frame are the dissimilar frame columns, the period during which the plurality of subpixels are for being driven further includes a second valid sensing period in which the valid sensing is for being performed on a third subpixel electrically connected to the first reference voltage line during a third frame period.

7. The display device of claim 1, wherein the period during which the plurality of subpixels are for being driven further includes a frame comparison period between the dummy sensing period and a compensation data generation period, wherein the frame comparison period is a period for comparing the first frame of the first frame period and the second frame of the second frame period, and determining whether a first column line of the first frame and a first column line of the second frame are similar frame columns or dissimilar frame columns.

8. The display device of claim 7, wherein, if the first column line of the first frame and the first column line of the second frame are the similar frame columns, a final compensation data is for being generated by subtracting dummy data from valid data during a compensation data generation period.

9. The display device of claim 7, wherein, if the first column line of the first frame and the first column line of the second frame are the dissimilar frame columns, a final compensation data generated during a compensation data generation period is valid data.

10. The display device of claim 1, further comprising a sensing control circuit for being electrically connected between a sampling switch included in the data driving circuit and the first reference voltage line, wherein the sensing control circuit includes:

a first switch for being electrically connected between the first reference voltage line and a first shared node;

a dummy capacitor for being electrically connected to the first shared node;

a second switch for being electrically connected between the dummy capacitor and a ground node;

a valid capacitor for being electrically connected to the first shared node; and a third switch for being electrically connected between the valid capacitor and the ground node.

11. The display device of claim 10, wherein the first valid sensing period includes:

a valid capacitor charging period during which the first switch and the third switch are for being turned on and the valid capacitor is for being charged with a voltage; and a valid sampling period during which the sampling switch is for being turned on and the valid sensing is for being performed.

12. The display device of claim 10, wherein the dummy sensing period includes:

a dummy capacitor charging period during which the first switch and the second switch are for being turned on and the dummy capacitor is for being charged with a voltage; and a dummy sampling period during which the sampling switch is for being turned on and the dummy sensing is for being performed.

13. A driving method of a display device, comprising:

performing a valid sensing on a first subpixel disposed in a first column line during a first frame period;

performing a dummy sensing on the first subpixel or a second subpixel disposed in the first column line during a second frame period; and generating final compensation data based on valid data for the valid sensing and dummy data for the dummy sensing, wherein, during the first frame period, a first frame is displayed on a display panel, and, during the second frame period, a second frame, consecutive to the first frame, is displayed on the display panel.

14. The driving method of claim 13, further comprising a frame comparison performed between the performing the valid sensing and the performing the dummy sensing, wherein the frame comparison includes comparing the first frame of the first frame period and the second frame of the second frame period, and determining whether a first column line of the first frame and a first column line of the second frame are similar frame columns or dissimilar frame columns.

15. The driving method of claim 14, wherein, if the first column line of the first frame and the first column line of the second frame are the similar frame columns and the valid sensing is performed on the first subpixel, the dummy sensing is performed on the second subpixel in performing the dummy sensing.

16. The driving method of claim 14, wherein, if the first column line of the second frame and the first column line of a third frame are the similar frame columns and the dummy sensing is performed on the second subpixel, the driving method further comprises a second valid sensing operation in which the valid sensing is performed on a third subpixel electrically connected to a first reference voltage line during a third frame period.

17. The driving method of claim 14, wherein, if the first column line of the second frame and the first column line of a third frame are the dissimilar frame columns, the driving method further comprises a second valid sensing operation in which the valid sensing is performed on a third subpixel electrically connected to a first reference voltage line during a third frame period.

18. The driving method of claim 13, further comprising a frame comparison performed between the performing the dummy sensing and the generating the final compensation data, wherein the frame comparison includes comparing the first frame of the first frame period and the second frame of the second frame period, and determining whether a first column line of the first frame and a first column line of the second frame are similar frame columns or dissimilar frame columns.

19. The driving method of claim 18, wherein, if the first column line of the first frame and the first column line of the second frame are the similar frame columns, the generating final compensation data includes generating the final compensation data by subtracting the dummy data from the valid data during the generating the final compensation data.

20. The driving method of claim 18, wherein, if the first column line of the first frame and the first column line of the second frame are the dissimilar frame columns, the final compensation data is the valid data.

* * * * *